United States Patent
Tanaka et al.

(10) Patent No.: US 9,070,008 B2
(45) Date of Patent: Jun. 30, 2015

(54) OBJECT RECOGNITION APPARATUS AND DICTIONARY DATA REGISTRATION METHOD

(71) Applicant: CANON KABUSHIKI KAISHA, Tokyo (JP)

(72) Inventors: Yuki Tanaka, Tokyo (JP); Akemi Kikuchi, Kawasasi (JP); Yasushi Ohwa, Machida (JP); Yasuhiko Iwamoto, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 271 days.

(21) Appl. No.: 13/719,526

(22) Filed: Dec. 19, 2012

(65) Prior Publication Data
US 2013/0163831 A1 Jun. 27, 2013

(30) Foreign Application Priority Data
Dec. 27, 2011 (JP) ................................. 2011-286624

(51) Int. Cl.
*G06K 9/62* (2006.01)
*G06K 9/00* (2006.01)

(52) U.S. Cl.
CPC ........ *G06K 9/00228* (2013.01); *G06K 9/00926* (2013.01)

(58) Field of Classification Search
None
See application file for complete search history.

(56) References Cited

U.S. PATENT DOCUMENTS 8,458,465 B1 * 6/2013 Stern et al. ................... 713/166

FOREIGN PATENT DOCUMENTS

| JP | 4057501 B | 3/2008 |
|----|-----------|--------|
| JP | 2009-086926 A | 4/2009 |

* cited by examiner

*Primary Examiner* — Brian P Werner
(74) *Attorney, Agent, or Firm* — Carter, DeLuca, Farrell & Schmidt, LLP

(57) ABSTRACT

In a personal authentication apparatus that compares input feature information with feature information stored in advance as dictionary data, thereby calculating a similarity and recognition a person, when additionally storing feature information in the dictionary data, the feature information is compared with the feature information of the same person already stored in the dictionary data. Pieces of feature information are put into groups for the same person based on the similarities and stored in the dictionary data.

12 Claims, 19 Drawing Sheets

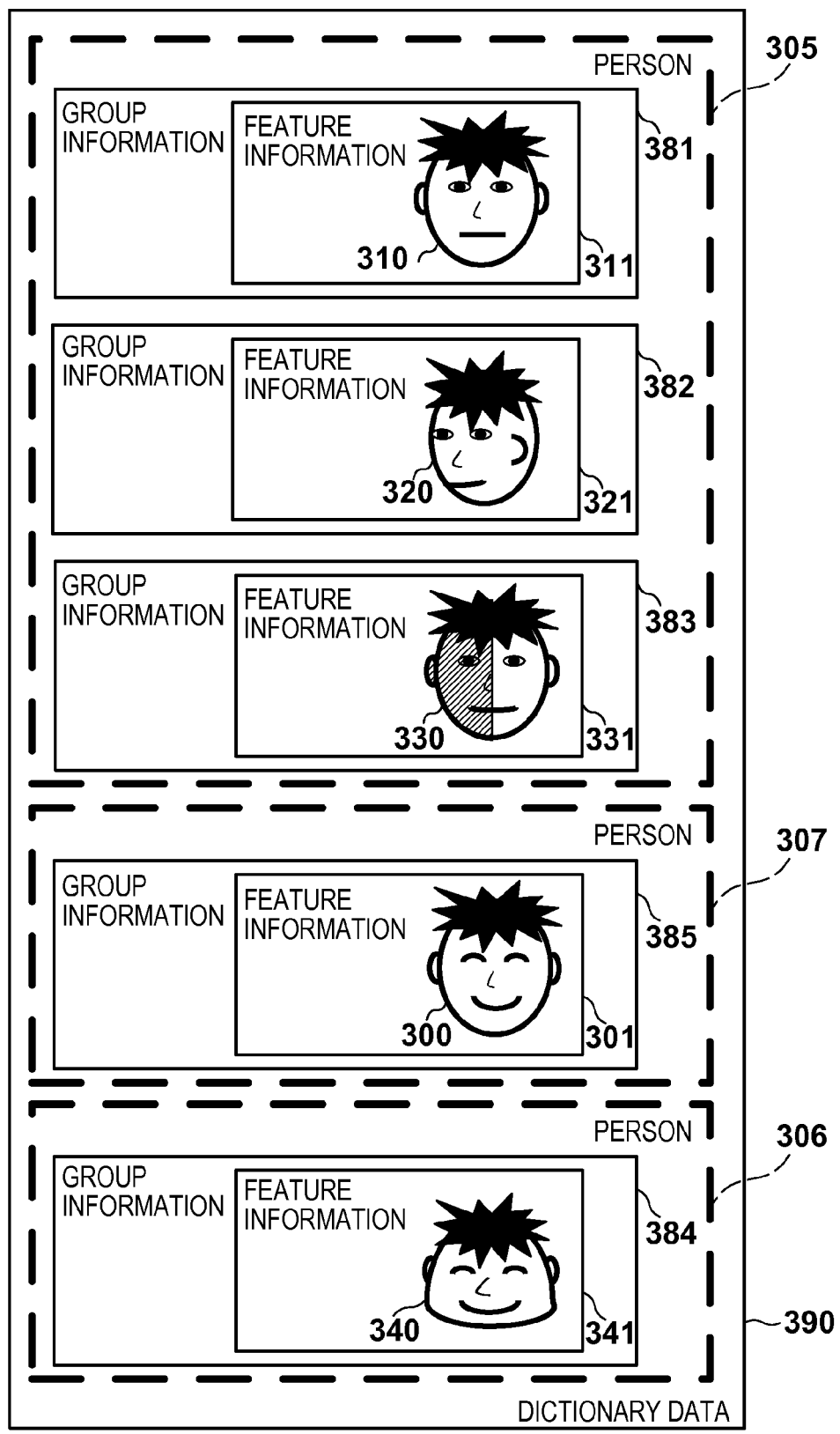

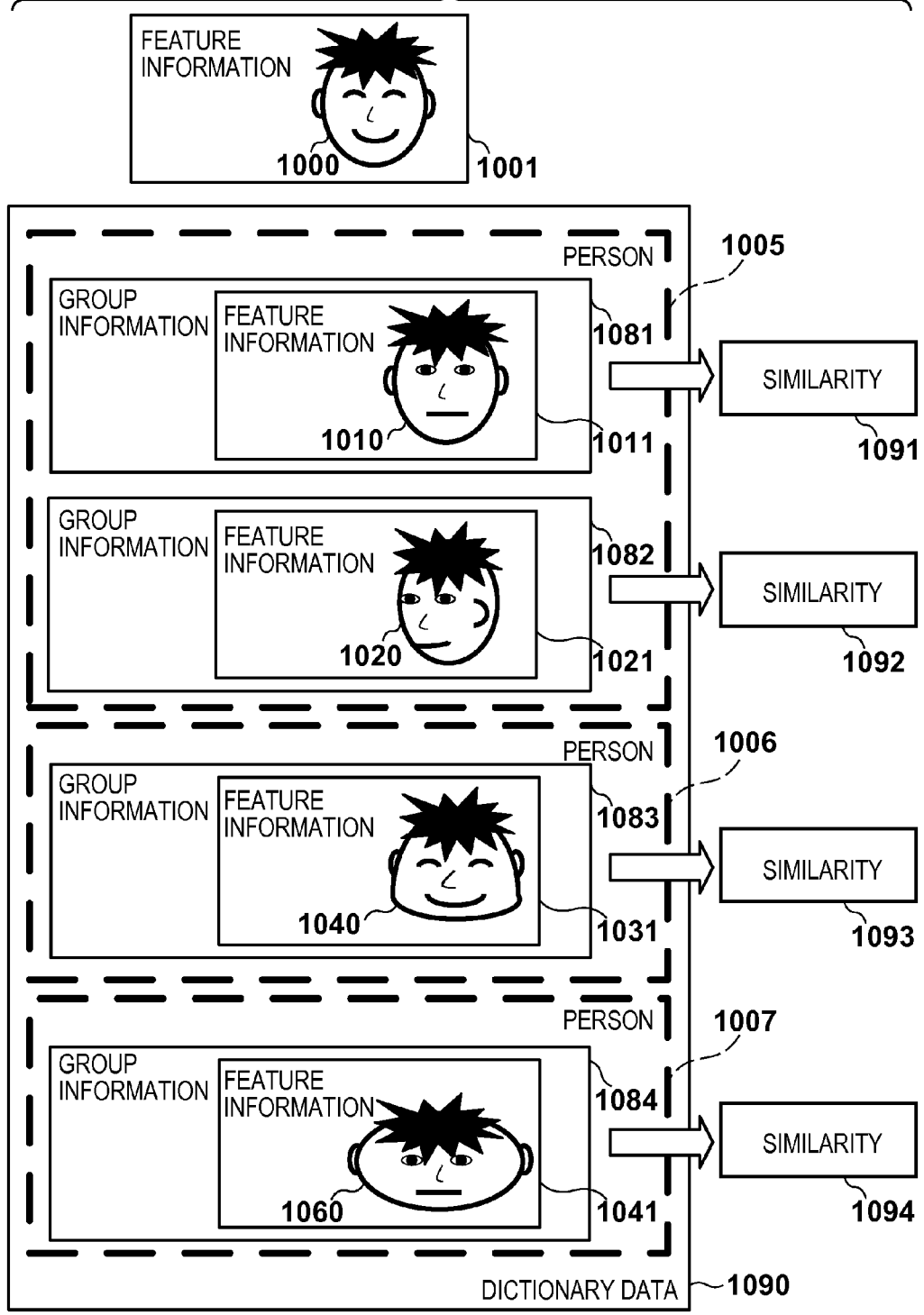

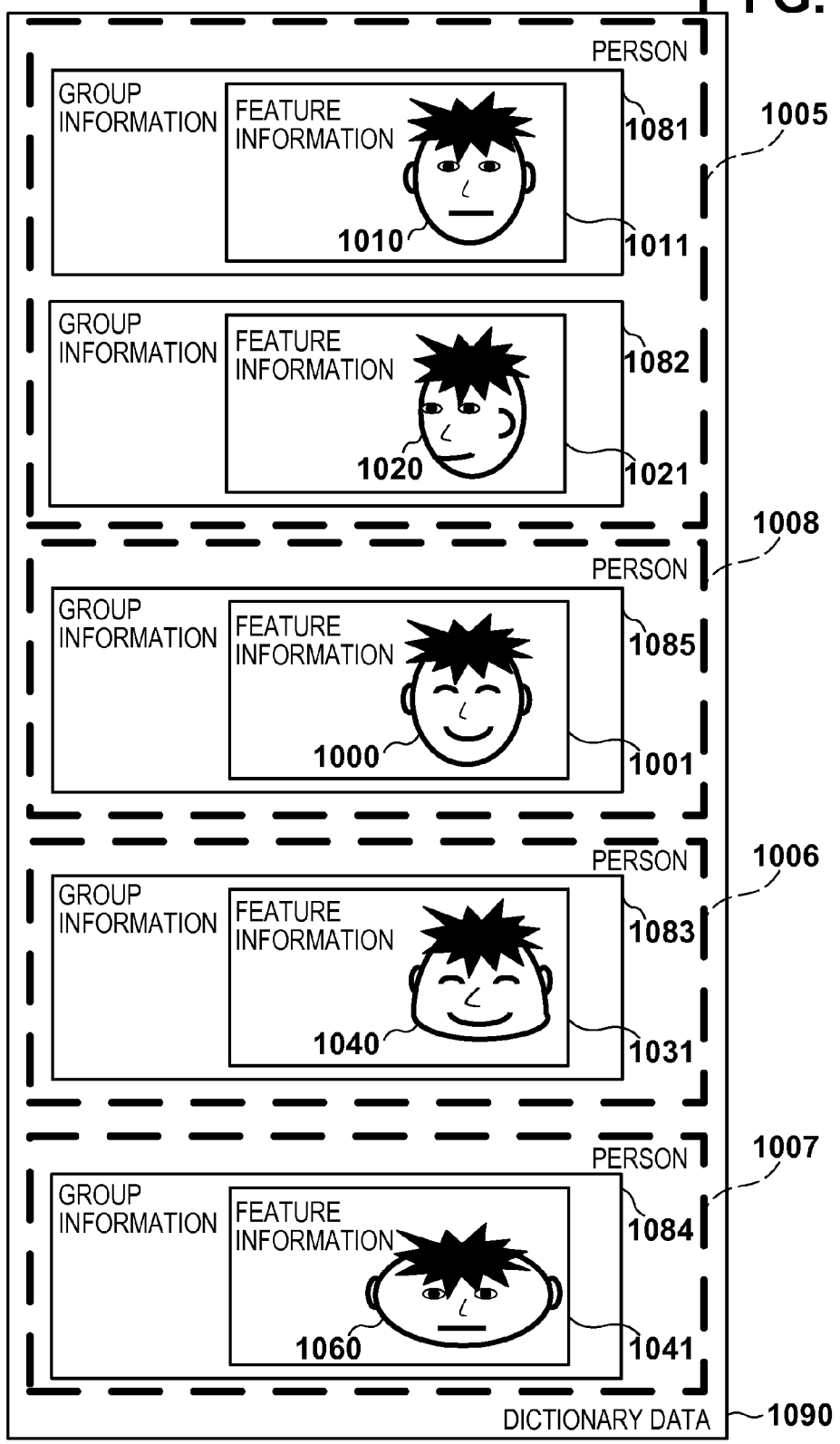

OBJECT RECOGNITION APPARATUS AND DICTIONARY DATA REGISTRATION METHOD

BACKGROUND OF THE INVENTION

1. Field of the Invention

The present invention relates to an object recognition apparatus and a dictionary data registration method and, more particularly, to a technique of recognizing an object by collating input data with data stored in advance as dictionary data.

2. Description of the Related Art

There is known a technique for registering the feature information of an object image in advance as dictionary data and recognizing the object in an input image. For example, a personal recognition method is known, which stores element data such as a face, a voice, or a fingerprint in advance as dictionary data for each of a plurality of persons to be recognized, and recognizes a person using the dictionary data. In such a personal recognition method, received element data of a person that is a personal recognition target is compared with element data stored as dictionary data, and to whom the element data of the recognition target person belongs is identified, thereby recognizing the person.

In this personal recognition method, when a face image is used as element data, the orientation of the face of the face image, the expression on the face image, and a change in the light environment (for example, the difference in contrast between front light, back light, and side light) where the face image is captured greatly affect the personal recognition accuracy. Japanese Patent No. 4057501 (to be referred to as patent literature 1 hereinafter) describes a personal authentication system that captures face images under a plurality of different light environments and stores them in dictionary data, thereby performing correct personal authentication even when the use environment (conditions) has changed.

In patent literature 1, however, it is necessary to store a plurality of face images abounding in variety in advance in the dictionary data. Since multiple conditions change in a complex manner, storing all face images corresponding to different combinations of conditions is burdensome to the user. In addition, since the number of face images to be stored increases, the processing time prolongs. To prevent this, in a method as described in Japanese Patent Laid-Open No. 2009-086926 (to be referred to as patent literature 2 hereinafter), subregions are set for a face image, and feature information is calculated for each of the set subregions to obtain feature information necessary for personal recognition, thereby improving the recognition accuracy using a small number of registered face images.

For example, personal recognition is performed in accordance with the following procedure. First, as shown in FIG. 6, a face 610 that is a recognition target face image is divided into pieces of feature information of subregions such as subregions 611, 612, and 613. The similarity between the subregion 611 and each of corresponding subregions (subregions 621, 631, and 641) of three face images (faces 620, 630, and 640) of the same person stored in dictionary data 690 is calculated. After that, the highest one of the similarities to the subregion 611 is selected. This processing is performed for all subregions of the face 610, and the selected similarities are integrated to calculate the similarities between the face 610 of the recognition target face image and the person of the three face images (faces 620, 630, and 640) stored in the dictionary data. This method makes it possible to decrease the number of face images to be stored in dictionary data for one person and perform accurate personal recognition while reducing the influence of conditions.

However, in the above-described personal recognition method, when the number of registered feature information corresponding to each person increases, a recognition error for recognizing another person as this person tends to occur more frequently. This is because the subregions in a plurality of face images of the same person stored in the dictionary data shift between the face images, or the feature of the face image of the same person largely changes. For example, when faces 701 to 704 are registered as the faces of the same person, as shown in FIG. 7, the feature of a subregion 712 of the face 702 largely changes from that of a subregion 711 of the face 701 because of the orientation of the face. Additionally, in a subregion 713 of the face 703, the detection positions of organs such as the eye and nose to determine the position of the subregion shift due to the influence of light, and consequently, the position of the subregion 713 shifts. The feature of a subregion 714 of the face 704 changes because of accessories such as a mask and glasses.

FIG. 8 is a view showing an example in which the face images of the same person shown in FIG. 7, which have shifts in the subregions, are stored in dictionary data 890, and similarities are calculated using the above-described personal recognition method. Note that faces 810, 820, 830, and 840 correspond to the faces 701, 702, 703, and 704, respectively. A subregion 801 of a face 800 shown in FIG. 8 is compared with subregions 811, 821, 831, and 841 that have shifts between the face images in the dictionary data. In this case, the similarity between one of these subregions and the subregion 801 may become high. If the same phenomenon occurs between another subregion 802 and subregions 812, 822, 832, and 842, a recognition error may occur. That is, a similarity 891 obtained by integrating the similarities between the recognition target face 800 and the faces 810, 820, 830, and 840 of another person becomes higher than a similarity 892 between the face 800 and a face 850 of the same person as that of the face 800, and a recognition error occurs.

SUMMARY OF THE INVENTION

The present invention has been made in consideration of the above-described problems, and according to an aspect of the present invention, there is provided an object recognition apparatus that prevents a decrease in the authentication accuracy even when the number of feature information concerning the same object increases in dictionary data.

According to one aspect of the present invention, there is provided an object recognition apparatus comprising: a storage unit configured to store dictionary data in which a plurality of pieces of feature information obtained from a plurality of images of one object are put into groups based on similarities thereof and registered in association with the object; an extraction unit configured to detect an object from an image and, from an image of the object, extract feature information to be newly registered; a selection unit configured to, when the object detected by the extraction unit is registered in the dictionary data, select a group corresponding to the detected object based on a similarity between the extracted feature information and feature information belonging to each group of the detected object; and a registration unit configured to, when the selection unit has selected the corresponding group, register the extracted feature information in the corresponding group of the dictionary data, and when the selection unit has not selected the corresponding group, add a new group to the detected object in the dictionary data and register the extracted feature information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A to 3D are views for explaining the dictionary data storage processing according to the first embodiment;

FIGS. 12A to 12D are views for explaining the dictionary data storage processing according to the third embodiment.

DESCRIPTION OF THE EMBODIMENTS

Several preferred embodiments of the present invention will now be described in detail with reference to the accompanying drawings. In the following embodiments, an example will be explained in which a human face is used as a recognition target object. That is, a face recognition apparatus serving as an object recognition apparatus will be exemplified. In addition, each embodiment will be described by exemplifying a digital camera 100 as an information processing apparatus having a function of storing dictionary data for face recognition, and a function of recognizing a face in an input image using the dictionary data.

First Embodiment

Figure 1:
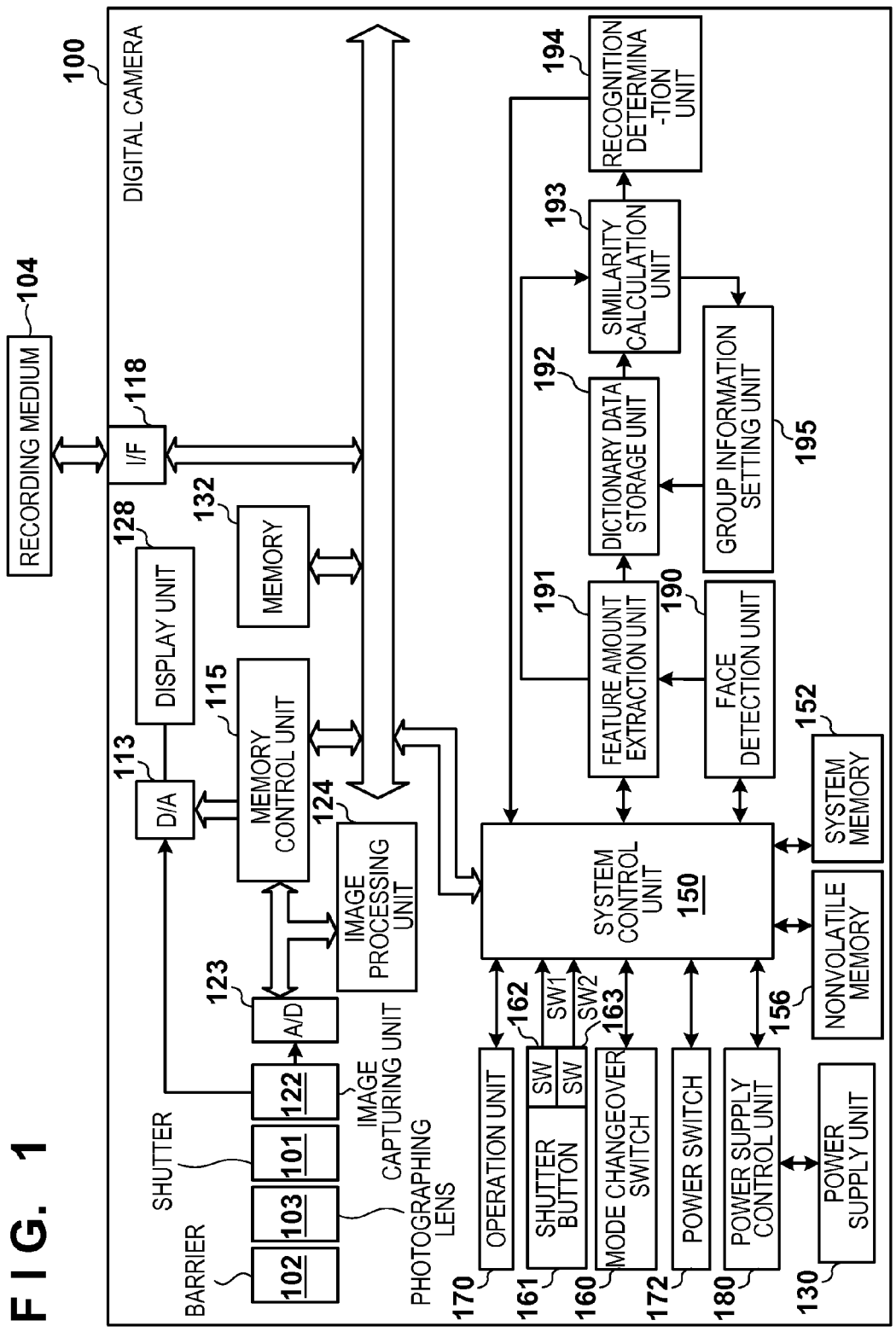
FIG. 1 is a block diagram showing an image capturing apparatus according to an embodiment.

FIG. 1 is a block diagram showing an example of the arrangement of the digital camera 100 according to the first embodiment. Referring to FIG. 1, a photographing lens 103 includes a focus lens. A shutter 101 has a stop function. An image capturing unit 122 is formed from a CCD or CMOS device that converts an optical image into an electrical signal. An A/D converter 123 converts an analog signal into a digital signal. The A/D converter 123 is used to convert an analog signal output from the image capturing unit 122 into a digital signal. A barrier 102 covers the image capturing unit including the photographing lens 103 of the digital camera 100, thereby preventing the image capturing system including the photographing lens 103, the shutter 101, and the image capturing unit 122 from becoming dirty or damaged.

An image processing unit 124 performs resize processing such as pixel interpolation or reduction and color conversion processing for data from the A/D converter 123 or image data from a memory control unit 115. The image processing unit 124 also performs predetermined arithmetic processing using captured image data. A system control unit 150 performs exposure control and focus control based on the obtained arithmetic result. AF (Auto Focus) processing, AE (Auto Exposure) processing, and EF (Electronic Flash pre-emission) processing of the TTL (Through The Lens) system are thus performed. The image processing unit 124 also performs predetermined arithmetic processing using captured image data, and AWB (Auto White Balance) processing of the TTL system is also performed based on the obtained arithmetic result.

The output data from the A/D converter 123 is directly written in a memory 132 via the image processing unit 124 and the memory control unit 115 or via the memory control unit 115 alone. The memory 132 stores image data obtained by the image capturing unit 122 and converted into digital data by the A/D converter 123 or image data to be displayed on a display unit 128. The memory 132 has a storage capacity enough to store a predetermined number of still images or a moving image and voice of a predetermined time.

The memory 132 also serves as a memory (video memory) for image display. A D/A converter 113 converts data for image display, which is stored in the memory 132, into an analog signal and supplies it to the display unit 128. The image data written in the memory 132 is thus displayed by the display unit 128 via the D/A converter 113. The display unit 128 performs display according to the analog signal from the D/A converter 113 on a display device such as an LCD.

A nonvolatile memory 156 is an electrically erasable/recordable memory. For example, an EEPROM or the like is used. The nonvolatile memory 156 stores constants and programs for the operation of the system control unit 150. The programs here mean programs to be used to execute processes shown in various kinds of flowcharts to be described later in this embodiment.

The system control unit 150 controls the entire digital camera 100. The system control unit 150 executes the programs recorded in the above-described nonvolatile memory 156, thereby implementing each processing according to this embodiment. A RAM is used as a system memory 152. The constants and variables for the operation of the system control unit 150, the programs read out from the nonvolatile memory 156, and the like are expanded on the system memory 152. The system control unit 150 controls the memory 132, the D/A converter 113, the display unit 128, and the like, thereby performing display control as well.

A mode changeover switch 160, a shutter button 161, a first shutter switch 162, a second shutter switch 163, and an operation unit 170 serve as operation means for inputting various kinds of operation instructions to the system control unit 150.

The mode changeover switch 160 switches the operation mode of the system control unit 150 to one of a still image recording mode, a moving image recording mode, a reproduction mode, and the like.

The first shutter switch 162 is turned on by operating the shutter button 161 provided on the digital camera 100 halfway, that is, so-called half stroke (image capturing preparation instruction) and generates a first shutter switch signal SW1. Operations such as AF (Auto Focus) processing, AE (Auto Exposure) processing, AWB (Auto White Balance) processing, and EF (Electronic Flash pre-emission) processing start based on the first shutter switch signal SW1.

The second shutter switch 163 is turned on by completing the operation of the shutter button 161, that is, so-called full stroke (image capturing instruction) and generates a second shutter switch signal SW2. Based on the second shutter switch signal SW2, the system control unit 150 starts a series of image capturing processing operations from signal read from the image capturing unit 122 until image data write in a recording medium 104.

The respective operation members of the operation unit 170 are appropriately allocated functions for each scene by, for example, selectively operating various function icons displayed on the display unit 128, and act as various kinds of function buttons. Examples of the function buttons are an end button, a return button, an image feed button, a jump button, a narrow-down button, and an attribute change button. For example, when a menu button is pressed, various kinds of settable menu screens are displayed on the display unit 128. The user can intuitively do various kinds of settings using the menu screen displayed on the display unit 128, a 4-way selector, and a set button.

A power supply control unit 180 is formed from a current detection circuit, a DC/DC converter, a switch circuit for switching a block to be energized, and the like, and detects the presence/absence of battery attachment, the type of battery, and the battery level. The power supply control unit 180 also controls the DC/DC converter based on the detection result and an instruction from the system control unit 150, and supplies a necessary voltage to the units including the recording medium 104 for a necessary period.

A power supply unit 130 is formed from a primary battery such as an alkali battery or a lithium battery; a secondary battery such as a NiCd battery, an NiMH battery, or an Li battery; an AC adapter, or the like. Reference numeral 118 denotes an interface to the external recording medium 104 such as a memory card or a hard disk. The recording medium 104 is a recording medium such as a memory card and is formed from a semiconductor memory, a magnetic disk, or the like. A power switch 172 on/off-controls the power.

The above-described digital camera 100 can perform image capturing using one-point AF or face AF. One-point AF means performing AF to one point at the center of the image capturing screen. Face AF means performing AF to a face in the image capturing screen, which is detected by a face detection function.

Reference numeral 190 denotes a face detection unit. The face detection unit 190 defects the edges of the eyes, mouth, and the like from an object included in image data, and extracts feature portions of the face of a person. That is, based on a region on image data occupied by a face (face position and face size) and face likelihood (face reliability), the face detection unit 190 executes face detection processing of detecting the data of the image region as face image data, and identification processing.

A feature amount extraction unit 191 extracts feature information to be used in personal recognition from face image data detected by the face detection unit 190. The feature information necessary for personal recognition is obtained by setting subregions about organs such as the eyes, nose, and mouth in a face region and calculating an LBP (Local Binary Pattern) for each set subregion. For further information about the LBP, see patent literature 2. A dictionary data storage unit 192 stores dictionary data to be used at the time of collation. The dictionary data is feature information calculated by the feature amount extraction unit 191.

A similarity calculation unit 193 compares feature information extracted by the feature amount extraction unit 191 from face image data detected by the face detection unit 190 with the dictionary data stored in the dictionary data storage unit 192 by pattern matching. Based on the comparison, the similarity calculation unit 193 calculates the similarity between the detected face image data and the face image data in the dictionary data storage unit 192.

Reference numeral 194 denotes a recognition determination unit. The recognition determination unit 194 compares the similarity calculated by the similarity calculation unit 193 with a preset threshold value for recognition. If the similarity is equal to or higher than the threshold value, the recognition determination unit 194 identifies that the face image detected by the face detection unit 190 belongs to a person stored in the dictionary data storage unit 192, that is, determines that the personal recognition has succeeded.

Reference numeral 195 denotes a group information setting unit 195. When registering new feature information in the dictionary data storage unit 192, the group information setting unit 195 controls whether to associate the feature information with an existing group or a newly generated group. The similarity calculation unit 193 calculates the similarity between new feature information and the feature information of the same person stored in the dictionary data storage unit 192 in advance. The group information setting unit 195 compares the calculated similarity with a preset grouping threshold value. If the calculated similarity is equal to or higher than the threshold value, the group information setting unit 195 associates existing group information stored in the dictionary data storage unit 192 with the feature information to be newly registered in the dictionary data storage unit 192. If the calculated similarity is lower than the threshold value, the group information setting unit 195 associates new group information with the feature information to be newly registered in the dictionary data storage unit 192. When registering a face of a new person, the group information setting unit 195 associates information to specify the new person and new group information with the feature information to be registered.

Note that the arrangement of the image capturing apparatus described with reference to FIG. 1 is merely an example. The arrangement of the image capturing apparatus according to the present invention is not limited to that shown in FIG. 1 if it can execute the operation to be described below. Not the image capturing apparatus but an information processing apparatus having a function of processing an image may be used.

Figure 2:
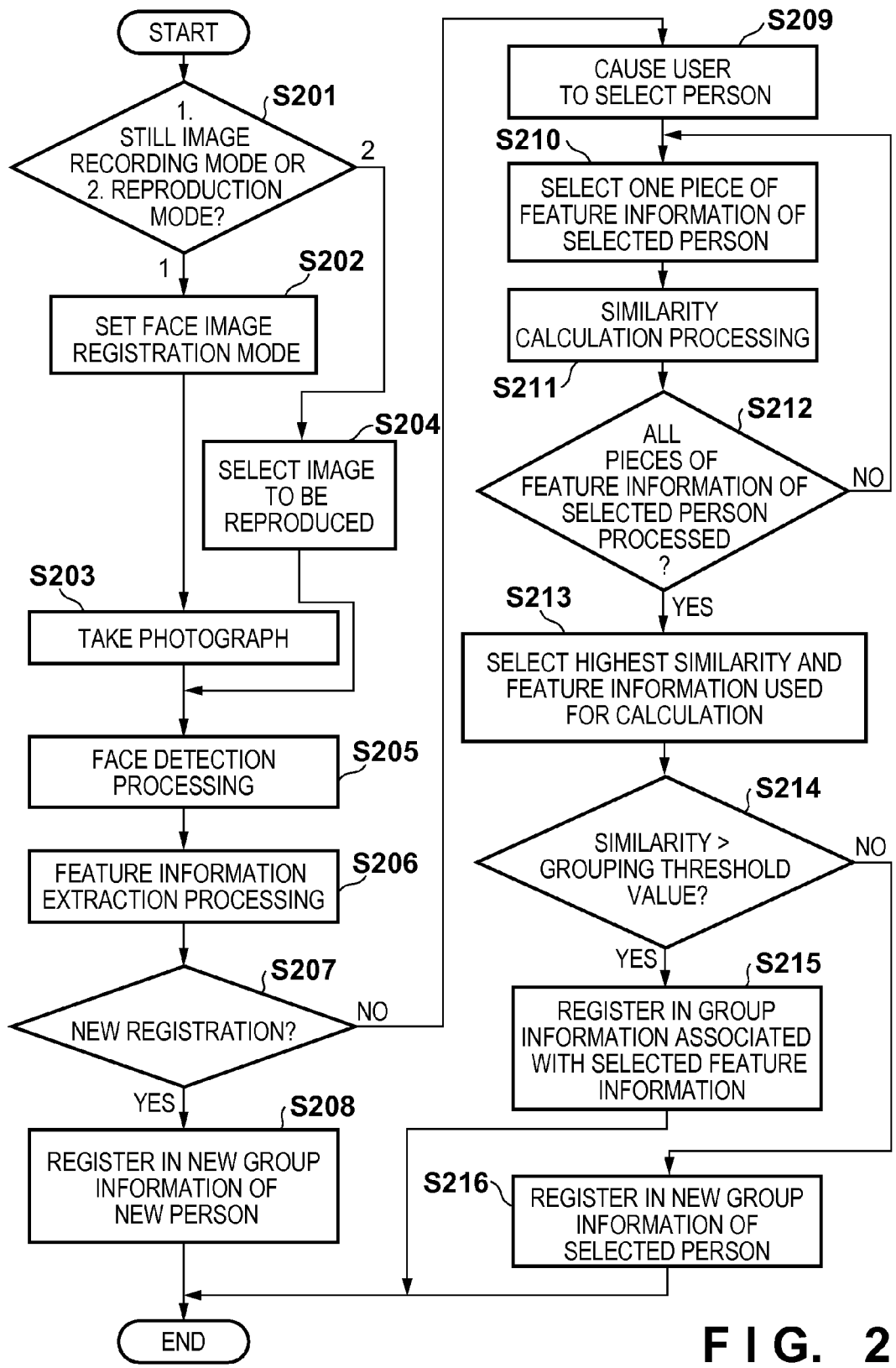
FIG. 2 is a flowchart showing dictionary data storage processing according to the first embodiment.

Dictionary data registration processing in the digital camera 100 according to the first embodiment will be described below in detail with reference to FIGS. 2 and 3A to 3D. FIG. 2 is a flowchart showing the dictionary data registration processing according to the first embodiment. FIGS. 3A to 3D are views for explaining the dictionary data registration processing according to this embodiment.

In step S201 after the start of processing, the system control unit 150 determines which one of the still image recording mode and the reproduction mode has been selected by the user. If the user has selected the still image recording mode, the process advances to step S202, and the system control unit 150 sets a face image registration mode. In step S203, the system control unit 150 performs control for image capturing. If it is determined in step S201 that the user has selected the reproduction mode, the process advances to step S204, and the system control unit 150 reproduces image data stored in the recording medium 104.

Figure 3A:
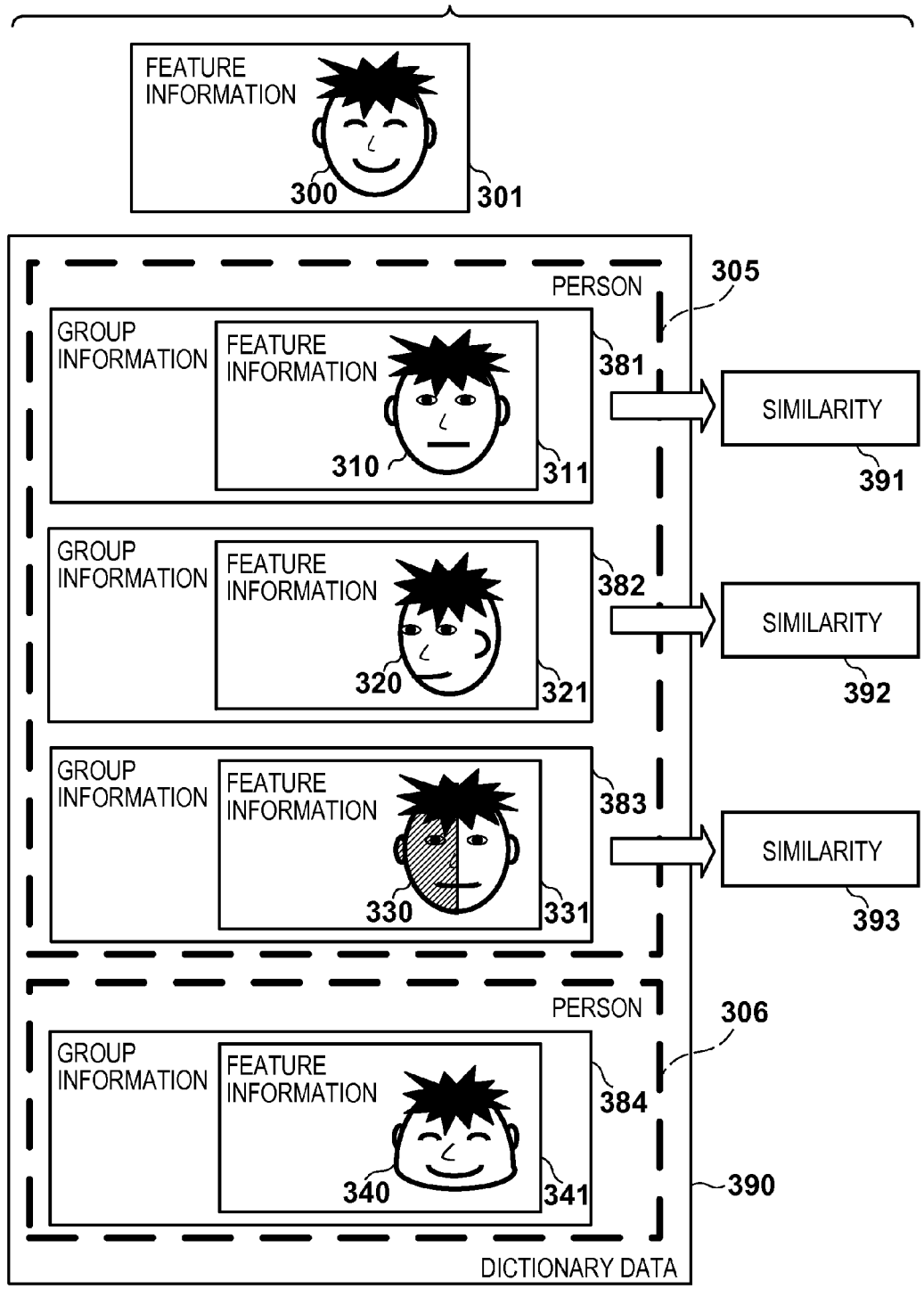

In step S205, the face detection unit 190 performs face detection processing for the image data selected in step S204 or image data captured in step S203. The face detected in step S205 is the face to be registered in the dictionary data storage unit 192. The following description will be made assuming that a face 300 shown in FIG. 3A is detected as the face to a registered in dictionary data 390. Note that as shown in FIG. 3A, in the dictionary data 390, pieces of feature information obtained from a plurality of images are grouped based on their similarities and registered for each object (person). In FIG. 3A, pieces of feature information 311, 321, and 331 are put into three groups by three pieces of group information 381, 382, and 383 and registered for the same person 305.

In step S206, the feature amount extraction unit 191 extracts feature information to be used as dictionary data from the image data of the face 300 detected in step S205 and to be stored in the dictionary data storage unit 192. The feature information extracted from the face 300 will be referred to as feature information 301. Note that the feature information 301 includes the feature information of a plurality of subregions of the face 300.

In step S207, the system control unit 150 accepts a user operation of selecting whether the same person as that of the face 300 exists among the persons registered in the dictionary data storage unit 192. If the accepted user operation indicates that feature information of the same person as that of the face 300 is not registered in the dictionary data storage unit 192, the person of the face 300 undergoes new registration. For new registration, in step S208, the group information setting unit 195 associates new group information including information to specify the person and information to group the face of the person with the feature information 301. After that, the feature information 301 and the new group information associated with the feature information are registered in the dictionary data storage unit 192, and the processing ends. FIG. 3B shows the dictionary data after the end of the processing of associating the feature information with new group information. In FIG. 3B, since the feature information is associated with new group information, new group information 385 is added and registered as a person 307. Note that the user operation in step S207 may be an operation of designating new registration or additional registration.

On the other hand, if the user operation accepted in step S207 indicates that feature information of the same person as that of the face 300 is registered in the dictionary data storage unit 192, this means not new registration but additional registration. The process advances to step S209. In step S209, the system control unit 150 accepts a user operation of selecting the same person as that of the face 300 out of the persons stored in the dictionary data storage unit 192. At this time, the system control unit 150 may present a list of persons registered in the dictionary data storage unit 192. For example, names associated with the respective registered persons are presented in the list. Representative face images of the respective persons may be presented, as a matter of course. In this case, assume that the person 305 that is the same person as that of the face 300 is selected from the persons stored in the dictionary data storage unit 192 by the user operation.

In step S210, the similarity calculation unit 193 selects one piece of feature information extracted from the face of the selected person 305. For example, assume that the feature information 311 is selected from the pieces of feature information 311, 321, and 331 that are the feature information of the person 305 stored in the dictionary data 390 shown in FIG. 3A. In step S211, the similarity calculation unit 193 calculates the similarity between the feature information selected in step S210 and the feature information 301 of the face 300 extracted by the feature amount extraction unit 191 in step S206. In FIG. 3A, a similarity 391 is calculated from the pieces of feature information 311 and 301.

In step S212, the system control unit 150 determines whether all pieces of feature information extracted from the face of the person 305 stored in the dictionary data storage unit 192 have been processed. If unprocessed feature information remains, the process returns to step S210. In this way, the similarity to the feature information 301 of the face 300 is calculated for all pieces of feature information associated with the selected person 305. In FIG. 3A, the above-described processing is repeated until the similarities (similarities 391, 392 and 393) between the feature information 301 of the face 300 and the pieces of feature information 311, 321 and 331 of the person 305 are calculated.

When the processing has ended for all pieces of feature information associated with the selected person 305, the process advances from step S212 to step S213. In step S213, the group information setting unit 195 selects a highest one of the similarities calculated in step S211 and the feature information used to calculate the highest similarity.

In step S214, the group information setting unit 195 compares the maximum similarity selected in step S213 with the grouping threshold value. If the maximum similarity is higher than the grouping threshold value, the process advances to step S215. The group information setting unit 195 associates the same group information as that of the feature information selected in step S213 with the feature information 301, and registers it in the dictionary data storage unit 192. If the maximum similarity is equal to or lower than the grouping threshold value, the process advances to step S216. The group information setting unit 195 generates new group information for the selected person 305, associates it with the feature information 301, and registers the information in the dictionary data storage unit 192.

For example, when the similarity 391 shown in FIG. 3A is selected as the maximum similarity, and this similarity exceeds the grouping threshold value, the group information setting unit 195 associates the group information 381 with the feature information 301 and registers it in the dictionary data 390. Similarly, when the similarity 392 shown in FIG. 3A is selected as the maximum similarity, and this similarity exceeds the grouping threshold value, the group information setting unit 195 associates the group information 382 with the feature information 301 and registers it in the dictionary data 390. When the similarity 393 is selected as the maximum similarity, and this similarity exceeds the grouping threshold value, the group information setting unit 195 associates the group information 383 with the feature information 301 and registers it in the dictionary data 390.

Figure 3C:
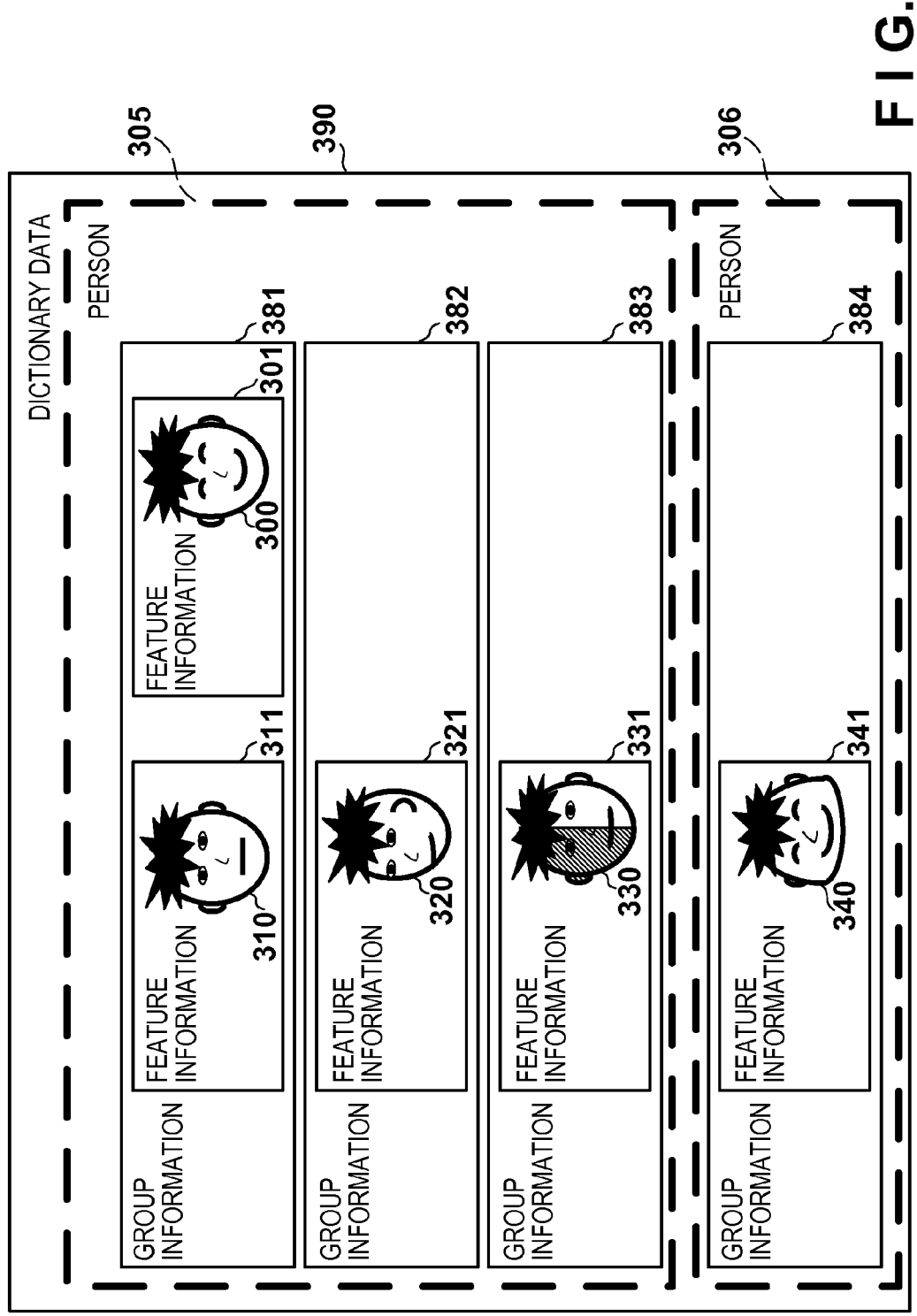
Figure 3D:
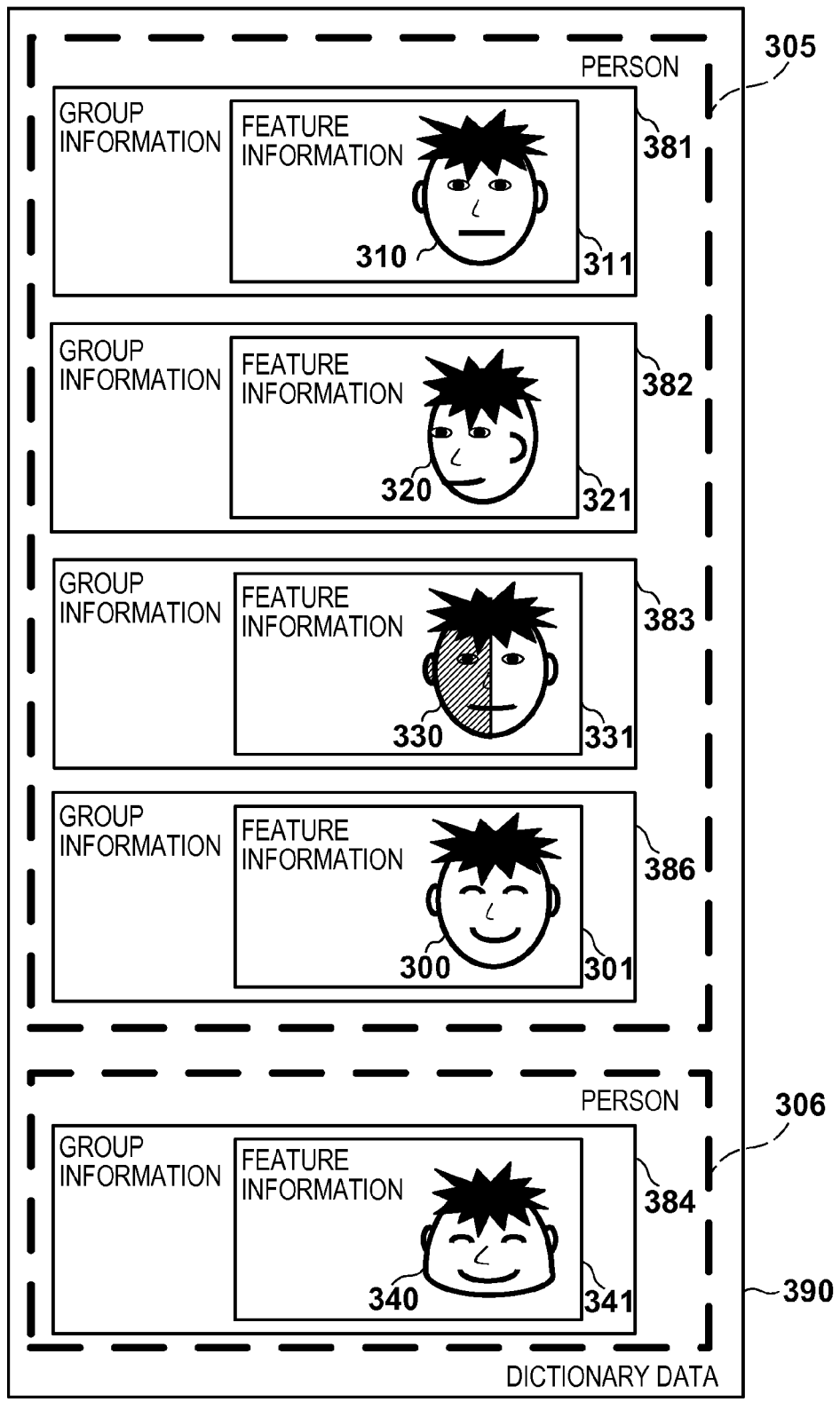

FIG. 3C shows the contents of the dictionary data after the end of processing when the similarity 391 is selected as the maximum similarity, and the similarity exceeds the grouping threshold value. When the similarity 391 exceeds the grouping threshold value, the group information 381 associated with the feature information 311 used to calculate the similarity 391 is associated with the feature information 301 and stored, as shown in FIG. 3C. FIG. 3D shows the contents of the dictionary data after the end of processing when the similarity 391 is selected as the maximum similarity, and the similarity does not exceed the grouping threshold value. Since the similarity 391 that is the maximum similarity does not exceed the grouping threshold value, the unselected similarities 392 and 393 are also equal to or lower than the grouping threshold value. Since none of the similarities exceeds the threshold value, new group information 386 is generated for the person 305 that the same as the selected person. The new group information 386 is associated with the feature information 301 and stored.

As described above, the respective pieces of feature information are put into groups specified by the group information and registered in the dictionary data stored in the dictionary data storage unit 192. That is, each feature information is registered so as to belong to a group specified by group information.

Figure 4:
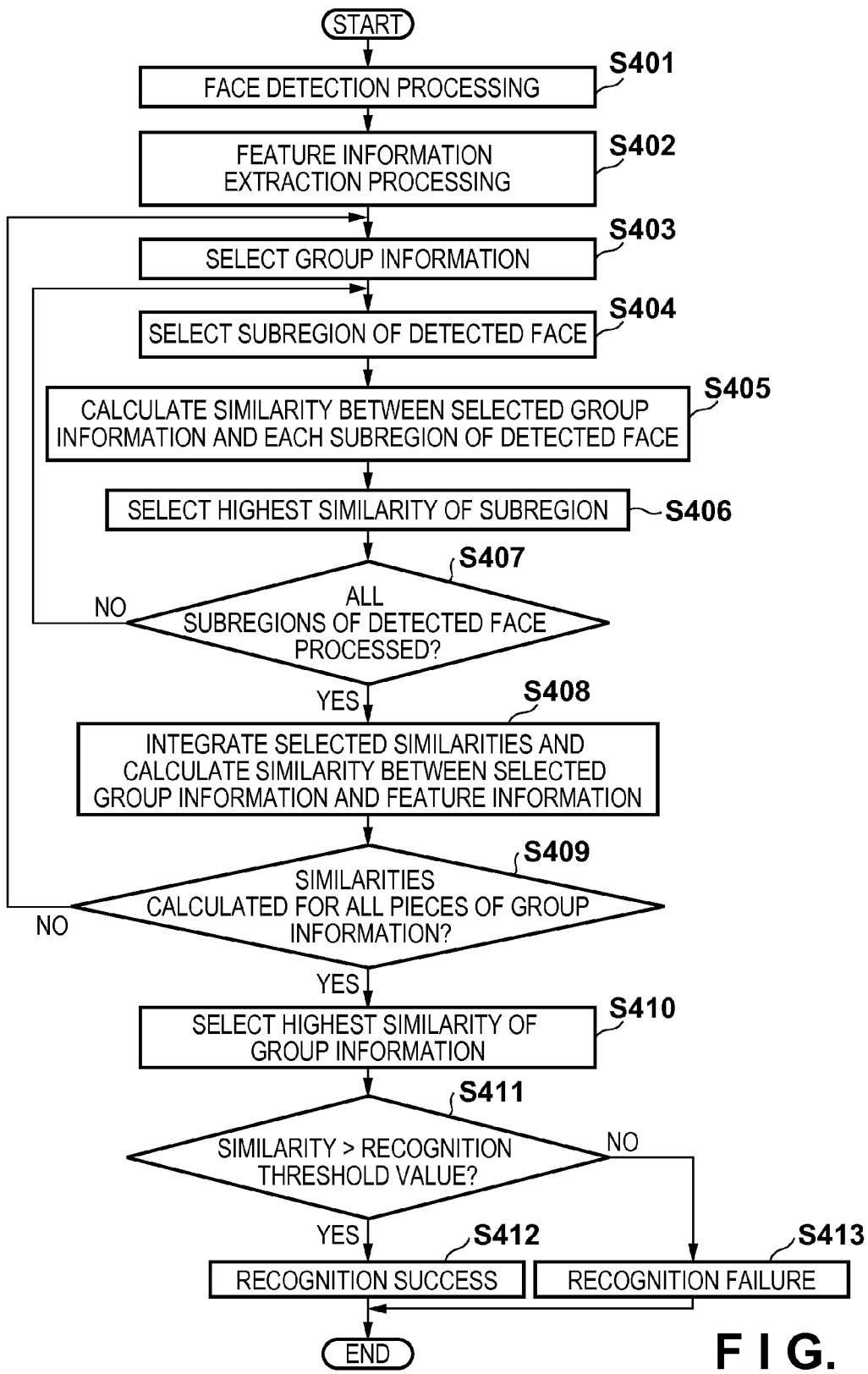
FIG. 4 is a flowchart showing personal recognition processing according to the first embodiment.
Figure 5:
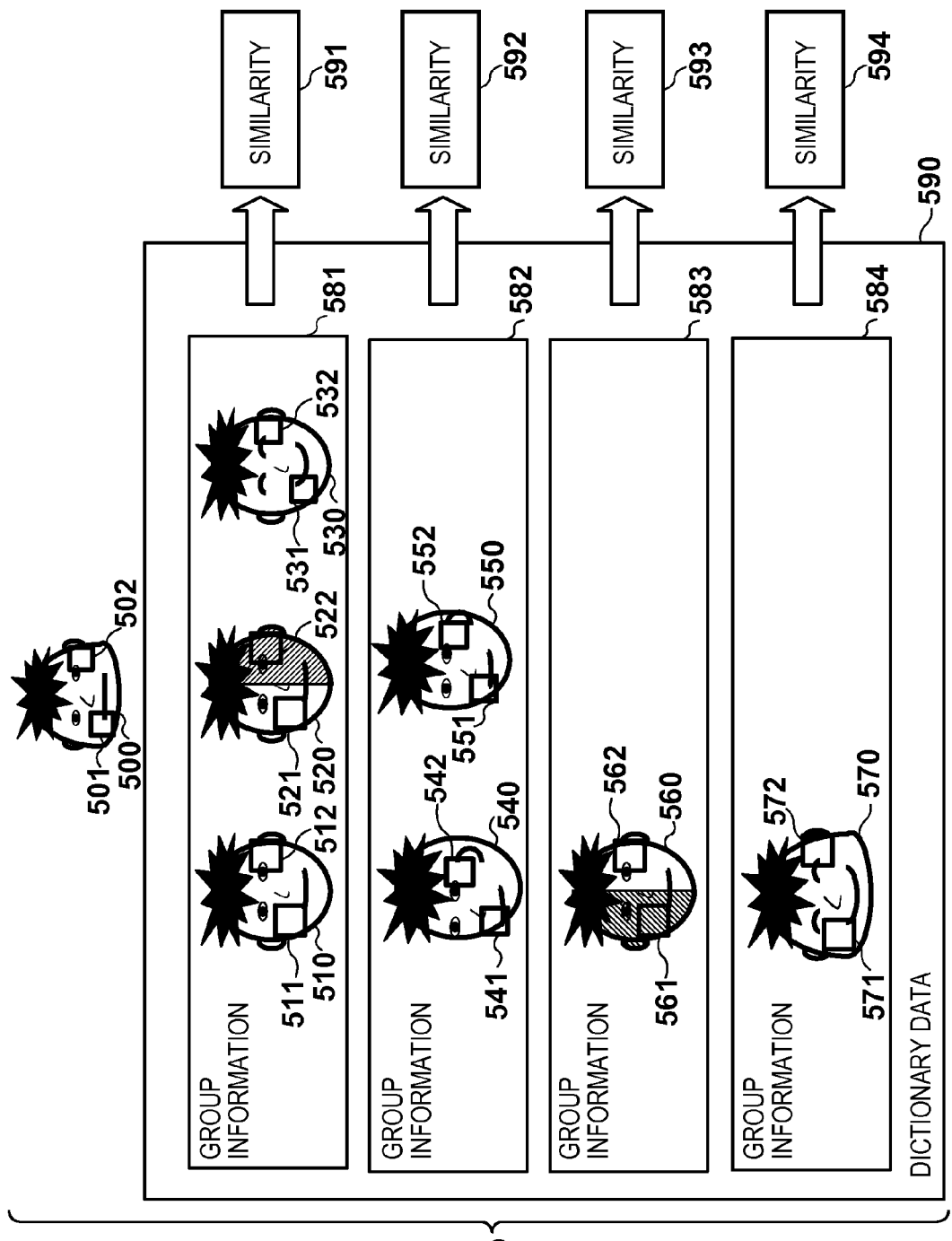
FIG. 5 is a view for explaining the personal recognition processing according to the first embodiment.
Figure 6:
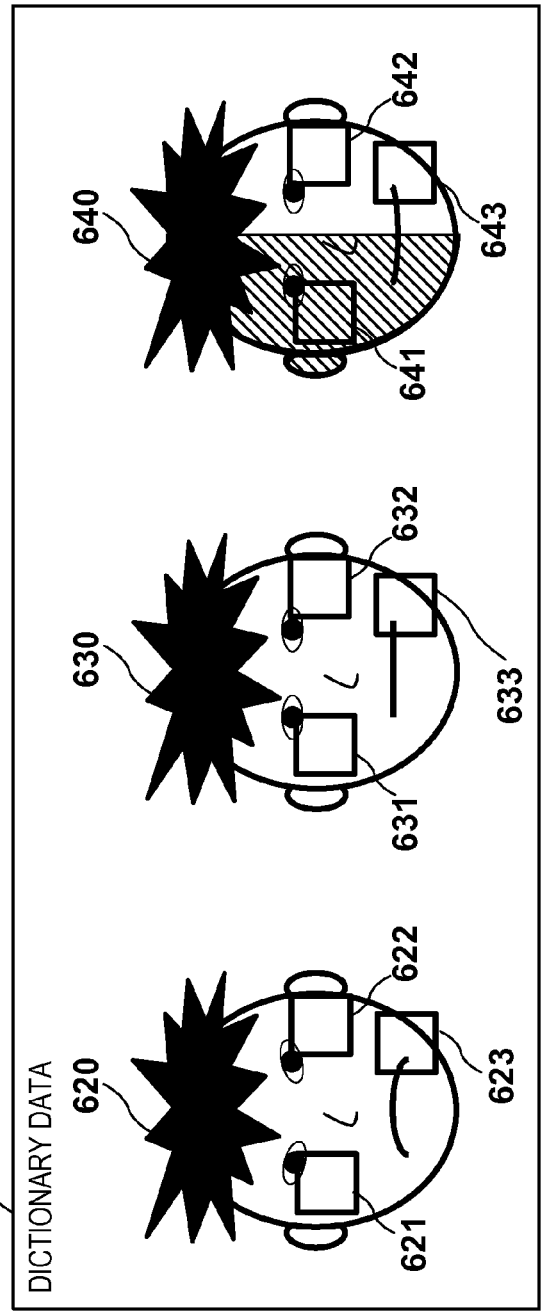
FIG. 6 is a view for explaining general personal recognition processing.
Figure 7:
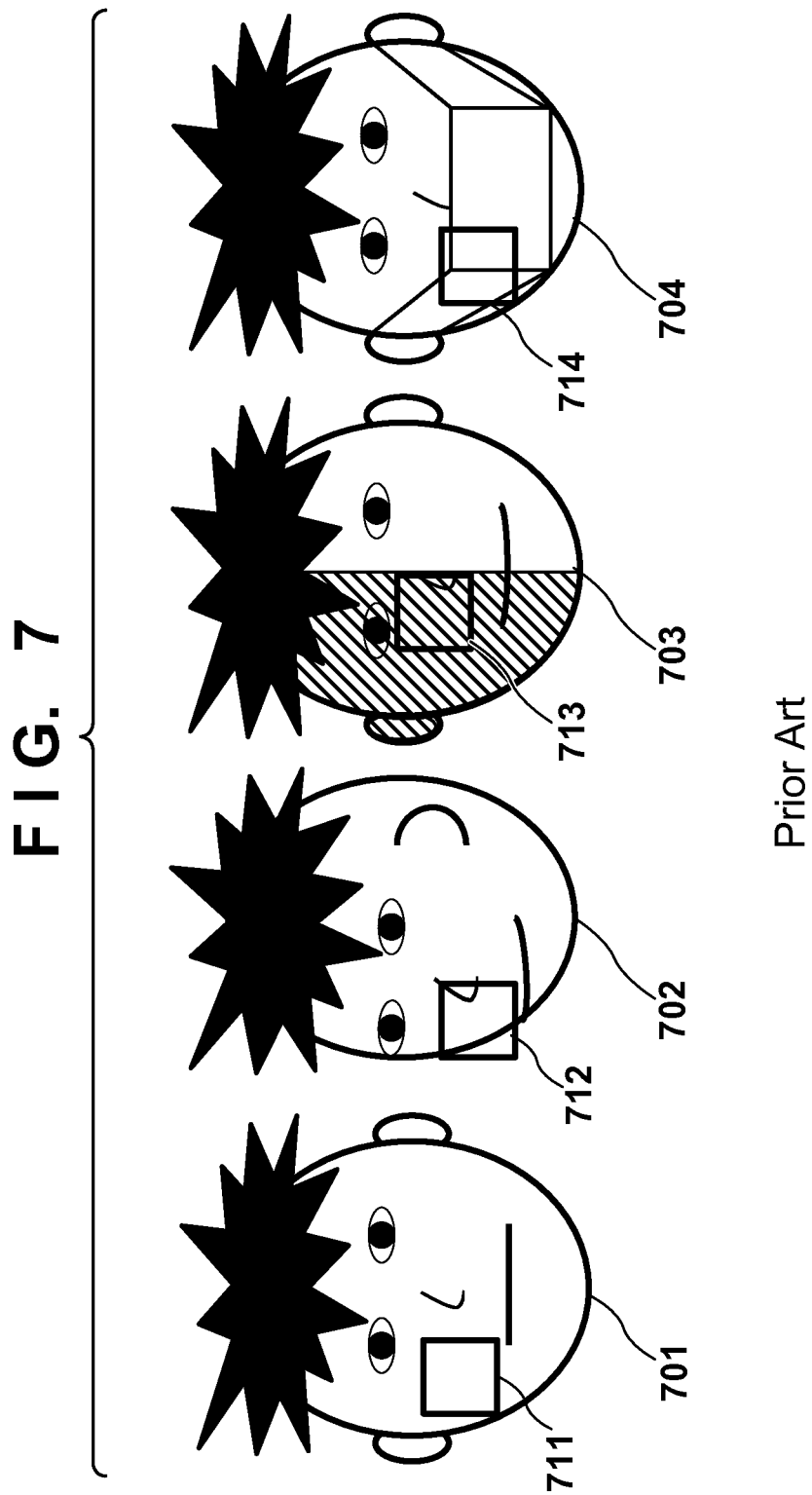
FIG. 7 is a view for explaining a problem that arises in the general personal recognition processing.
Figure 8:
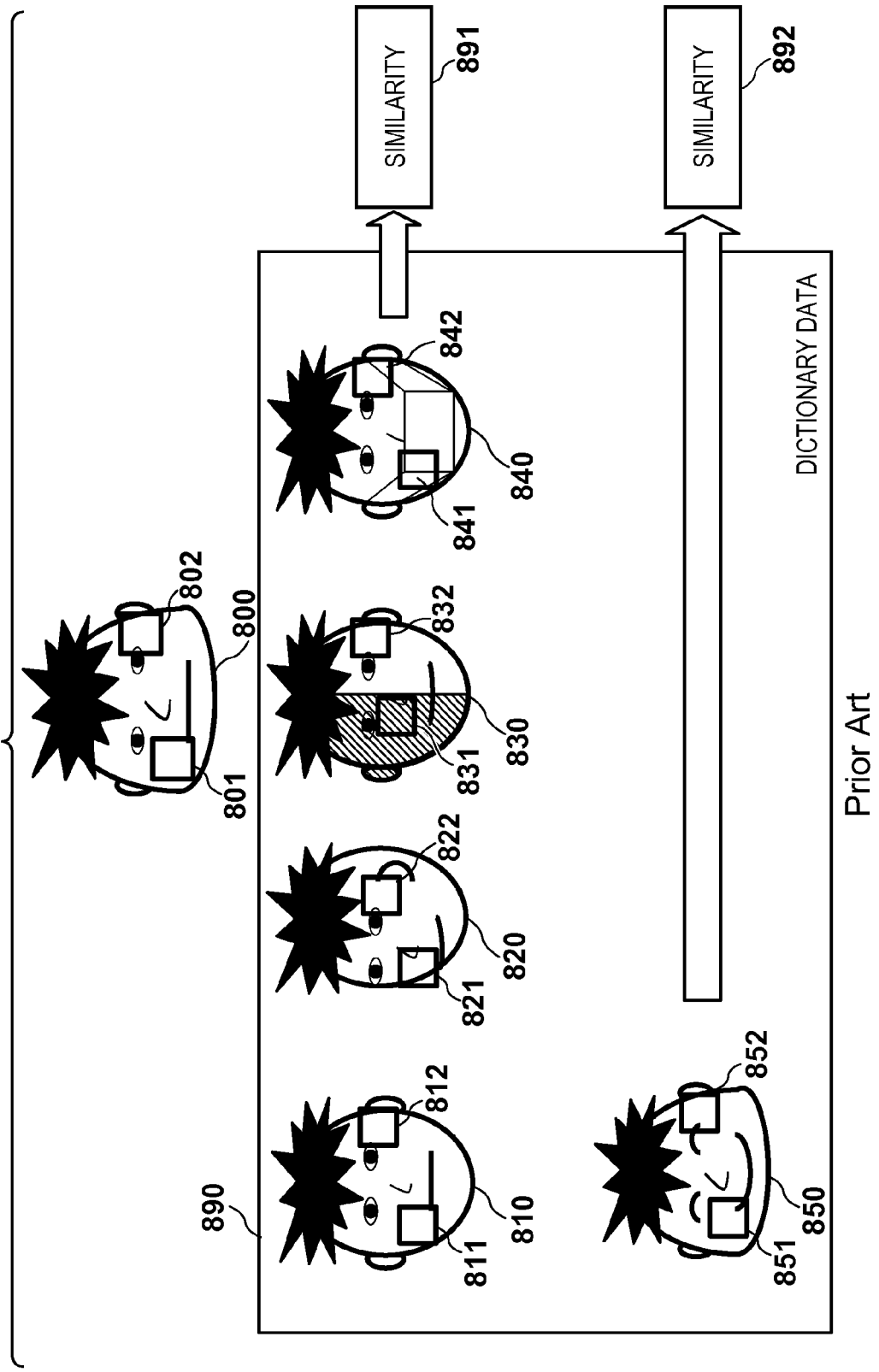
FIG. 8 is a view for explaining the general personal recognition processing.

Personal recognition processing using the feature information and group information stored in the dictionary data storage unit 192 will be described below in detail with reference to the flowchart of FIG. 4 and FIG. 5. FIG. 4 is a flowchart showing personal recognition processing according to the first embodiment. FIG. 5 is a view for explaining the similarity calculation processing according to this embodiment.

In step S401, the face detection unit 190 executes face detection processing for input image data. A face detected here is the face to be recognized. The process advances to step S402, and the feature amount extraction unit 191 extracts feature information to be used for personal recognition from the image data of a face 500 detected in step S401.

Feature information of each subregion obtained by dividing the face 500 that is the recognition image into several subregions (subregions 501 and 502) is used, as shown in FIG. 5. In the dictionary data storage unit 192 as well, the feature information of each subregion and group information associated with it are registered. For example, group information 581 is registered in association with the pieces of feature information of subregions 511, 521, and 531 of faces 510, 520, and 530. That is, the pieces of feature information of subregions 511, 521, and 531 belong to the group specified by the group information 581. In step S403, the similarity calculation unit 193 selects group information to be used for similarity calculation from the dictionary data stored in the dictionary data storage unit 192. In FIG. 5, the group information 581 is selected first.

In step S404, the similarity calculation unit 193 first selects the subregion 501 of the face 500. In step S405, the similarity calculation unit 193 calculates a similarity using feature information corresponding to the subregion 501 and feature information corresponding to the subregion 501 out of the pieces of feature information associated with the selected group information. In FIG. 5, a similarity is calculated using the feature information of the subregion 501 and the pieces of feature information of the subregions 511, 521, and 531. That is, the similarity between the recognition target subregion 501 and each of the subregions 511, 521, and 531 registered in the dictionary data storage unit 192 is calculated.

In step S406, the similarity calculation unit 193 selects a highest one of the similarities between the subregion 501 and the subregions 511, 521, and 531 calculated in step S405. In step S407, the similarity calculation unit 193 determines whether the processes in steps S404 to S406 have ended for all subregions of the face 500 that is the recognition target. If an unprocessed subregion remains, the process returns to step S404. If all subregions have been processed, the process advances to step S408.

In step S408, the similarity calculation unit 193 integrates the similarities (maximum similarities for the respective subregions) selected for the respective subregions of the face 500, thereby calculating a similarity 591 between the face 500 and the group information selected in step S403. Note that integration of similarities can be done by, for example, obtaining the average value of the plurality of similarities to be integrated or obtaining the maximum value of the plurality of similarities to be integrated. In step S409, the similarity calculation unit 193 determines whether the processes in steps S403 to S408 have ended for all pieces of group information registered in the dictionary data storage unit 192. If unprocessed group information remains, the process returns to step S403 to repeat the above-described processing. The similarities to the face 500 are thus obtained for all pieces of group information 581 to 584.

Upon determining in step S409 that all pieces of group information have been processed, the process advances to step S410. In step S410, the recognition determination unit 194 selects a maximum one of the similarities calculated (integrated) in step S408. In step S411, the recognition determination unit 194 compares the similarity selected in step S410 with a recognition threshold value. If the similarity selected in step S410 is higher than the recognition threshold value, the process advances to step S412, and the recognition determination unit 194 determines that the recognition has succeeded. That is, the person associated with the group information of the highest similarity is determined as the recognition result. When it is determined that the recognition has succeeded, the system control unit 150, for example, causes the display unit 128 to display a face frame representing that the personal recognition has succeeded. On the other hand, if the similarity selected in step S410 is equal to or lower than the recognition threshold value, the process advances to step S413, and the recognition determination unit 194 determines that the recognition has failed. When it is determined that the recognition has failed, the system control unit 150 ends the processing without displaying the face frame representing that the personal recognition has succeeded.

As described above, according to the first embodiment, when registering, as dictionary data, feature information for a plurality of face images of the same person, the pieces of feature information of the same person are put into groups of similar information and registered. This allows to perform recognition using a plurality of pieces of feature information of the same person at the time of face recognition and also reduce occurrence of recognition errors because a mixture of pieces of feature information under largely different environments is not used.

Second Embodiment

Figure 9:
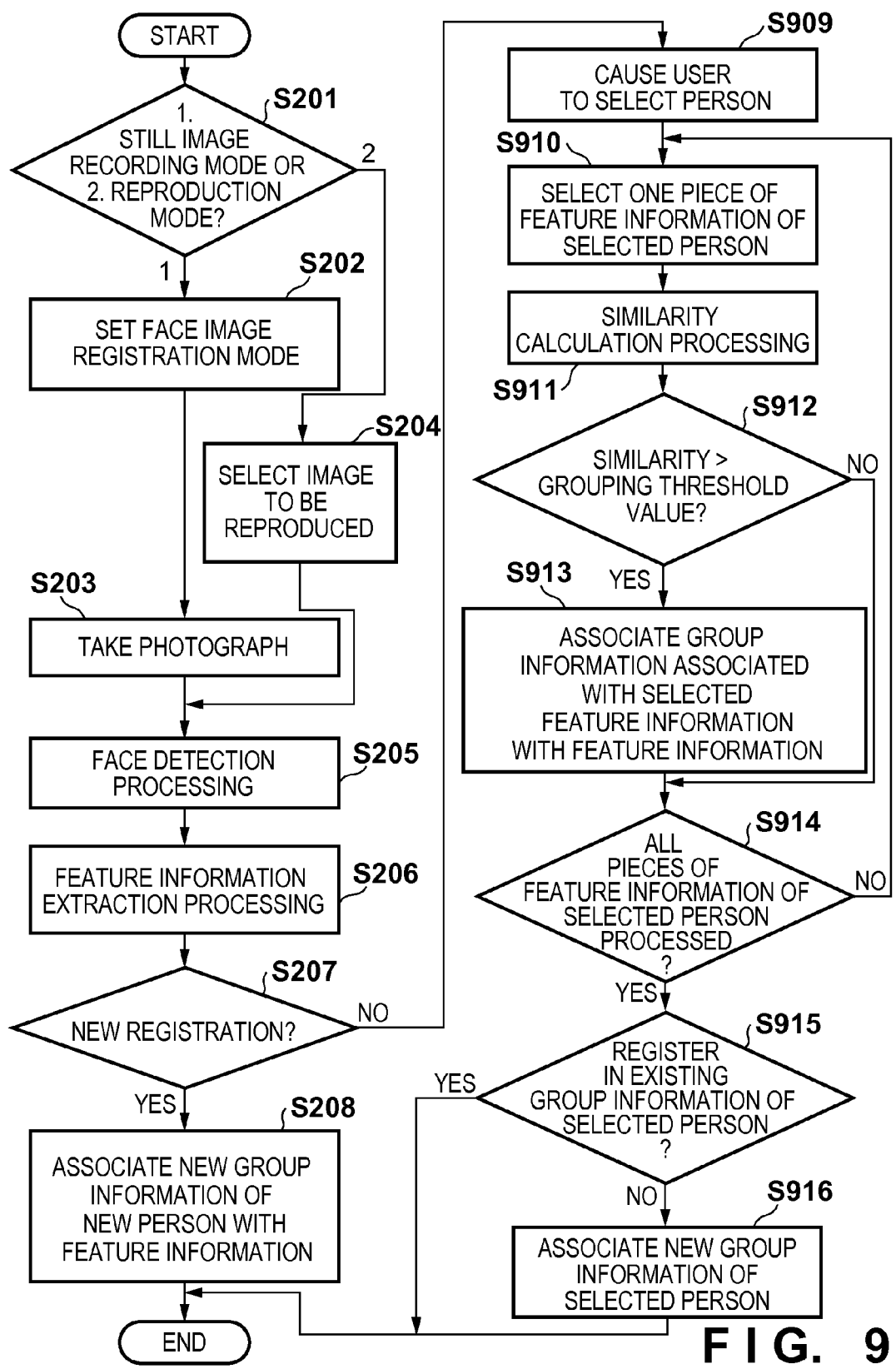
FIG. 9 is a flowchart showing dictionary data record processing according to the second embodiment.
Figure 10:
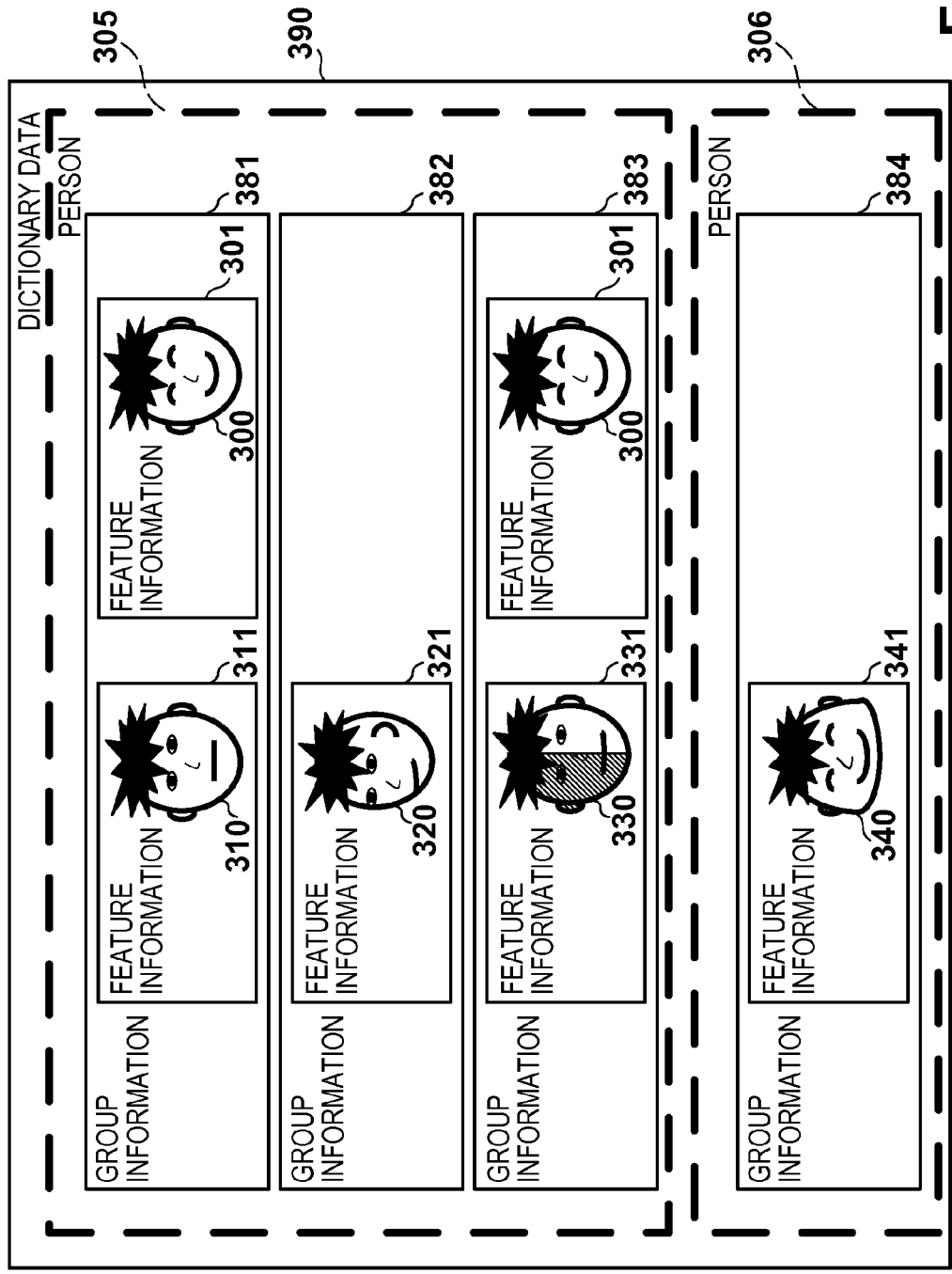
FIG. 10 is a view for explaining dictionary data registration processing according to the second embodiment.

Dictionary data storage processing by an image capturing apparatus according to the second embodiment will be described below in detail with reference to FIGS. 9 and 10. FIG. 9 is a flowchart for explaining dictionary data storage processing according to the second embodiment. FIG. 10 is a view for explaining dictionary data registration processing according to the second embodiment. Note that the arrangement of a digital camera 100 serving as the image capturing apparatus according to the second embodiment is the same as that described in the first embodiment (FIG. 1). In addition, the processes in steps S201 to S208 of FIG. 9 are the same as those described in the first embodiment (FIG. 2).

If a user operation accepted by a system control unit 150 in step S207 indicates additional registration, the process advances to step S909. In this case, pieces of feature information of the same person as that of a face 300 (FIG. 3A) are registered in a dictionary data storage unit 192. In step S909, the system control unit 150 accepts a user operation of selecting the same person as that of the face 300 out of the persons stored in the dictionary data storage unit 192.

In step S910, a similarity calculation unit 193 selects one piece of feature information extracted from the face of a selected person 305. For example, assume that feature information 311 is selected from pieces of feature information 311, 321, and 331 that are the feature information of the person 305 stored in dictionary data 390 shown in FIG. 3A.

In step S911, the similarity calculation unit 193 calculates the similarity between the feature information selected in step S910 and feature information 301 of the face 300 extracted by the feature amount extraction unit 191 in step S206. In FIG. 3A, a similarity 391 is calculated from the pieces of feature information 311 and 301.

In step S912, a group information setting unit 195 compares the similarity 391 calculated in step S911 with a grouping threshold value. If the similarity 391 is higher than the grouping threshold value, the feature information 301 can belong to the group (group information 381) to which the selected feature information 311 belongs. Hence, the process advances to step S913, and the group information setting unit 195 associates group information associated with the feature information selected out of the pieces of feature information of the selected person 305 with the feature information 301. If the similarity 391 is equal to or lower than the grouping threshold value, the process skips step S913.

In step S914, it is determined the processes in steps S910 to S913 have ended for all pieces of feature information extractable from the face of the person 305 stored in the dictionary data storage unit 192. If the processes have not ended for all pieces of feature information, the process returns to step S910. If the processes have ended for all pieces of feature information, the process advances to step S915.

With the above-described processing, when the similarity 391 shown in FIG. 3A exceeds the grouping threshold value, the group information 381 is associated with the feature information 301. If, for example, a similarity 392 does not exceed the grouping threshold value, group information 382 is not associated with the feature information 301. The state of the dictionary data when the similarity 391 exceeds the grouping threshold value, and the similarity 392 does not exceed the grouping threshold value is shown in FIG. 3C. When a similarity 393 exceeds the grouping threshold value, group information 383 is associated with the feature information 301, too. The state of the dictionary data when the similarities 391 and 393 exceed the grouping threshold value, and the similarity 392 does not exceed the grouping threshold value is shown in FIG. 10.

In step S915, it is determined whether the new group information of the selected person 305 has been registered in one of pieces of existing group information. If the new group information has been registered in one of the pieces of existing group information, the feature information 301 has been stored in the dictionary data storage unit 192 in association with the group information, and the processing directly ends. If the feature information 301 has not been registered in any one of the pieces of existing group information, the process advances to step S916. In step S916, the group information setting unit 195 adds new group information to the selected person 305 and associates the new group information with the feature information 301. The feature information 301 and the new group information associated with the feature information 301 are stored in the dictionary data storage unit 192, and the processing ends.

As described above, in FIG. 10, since the similarities 391 and 393 exceed the grouping threshold value, the pieces of group information 381 and 383 are associated with the feature information 301. The feature information 301 and the pieces of group information 381 and 383 associated with the feature information 301 are stored in the dictionary data storage unit 192. The second embodiment thus allows one piece of feature information (the feature information 301 in FIG. 10) to belong to a plurality of groups.

The state of the dictionary data when none of the similarities 391, 392, and 393 exceeds the grouping threshold value is shown in FIG. 3D. In this case, since none of the similarities exceeds the threshold value, group information 386 is associated with the feature information 301 as new group information of the selected person 305. The feature information 301 and the group information 386 associated with the feature information 301 are stored in the dictionary data storage unit 192.

Personal recognition processing using the dictionary data generated by the above-described dictionary data storage processing according to the second embodiment is the same as in the first embodiment. Note that in steps S912 and S913, all groups to which, out of the pieces of feature information registered in the dictionary data for the detected object, feature information whose similarity to the feature information extracted in step S206 is higher than a predetermined threshold value belongs are associated with the feature information. However, the present invention is not limited to this. The number of group information to be associated with the feature information may be limited. For example, a predetermined number of group information in descending order of similarity calculated in step S911 may be associated with the feature information extracted in step S206.

Third Embodiment

Figure 11:
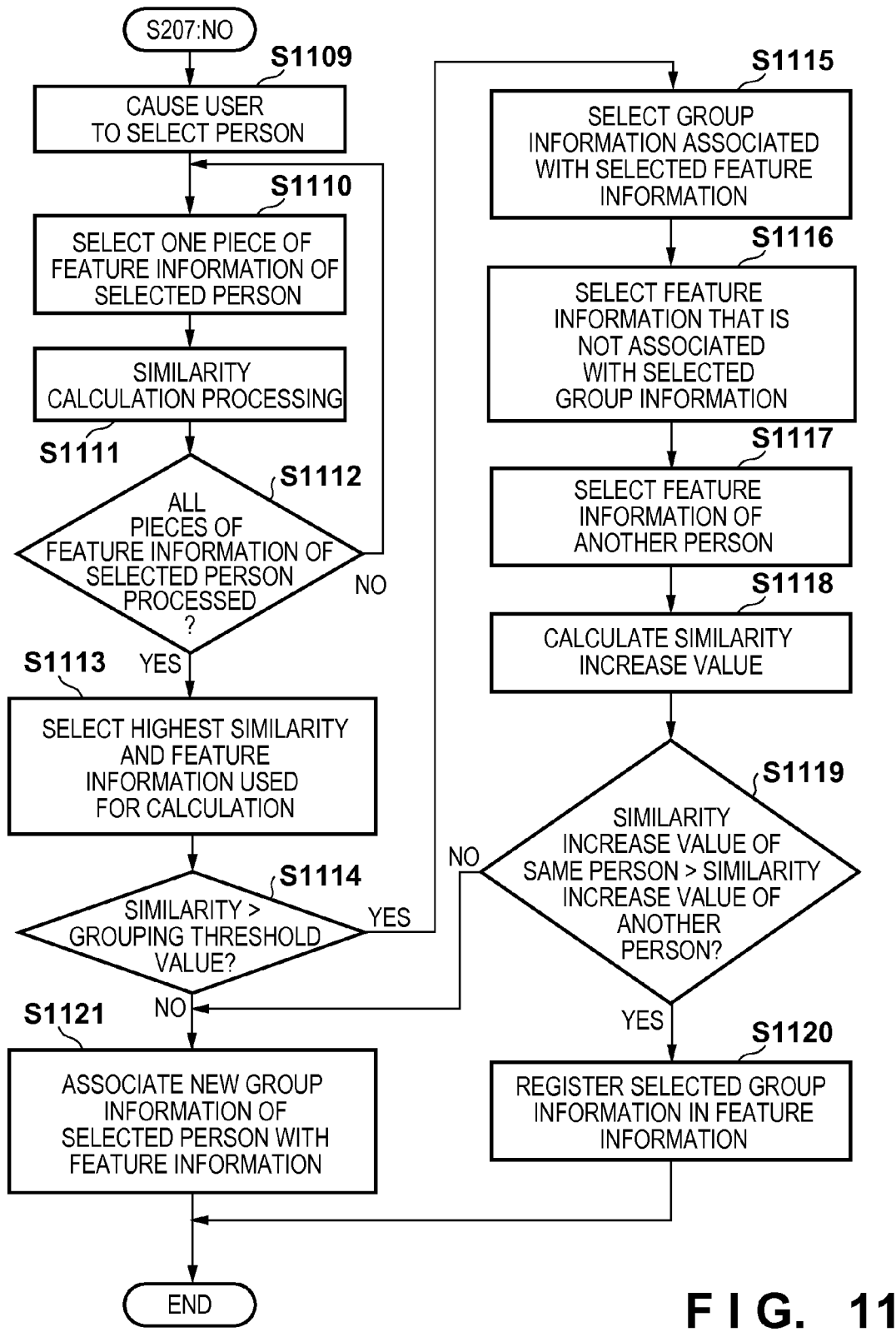
FIG. 11 is a flowchart showing dictionary data storage processing according to the third embodiment.
Figure 12C:
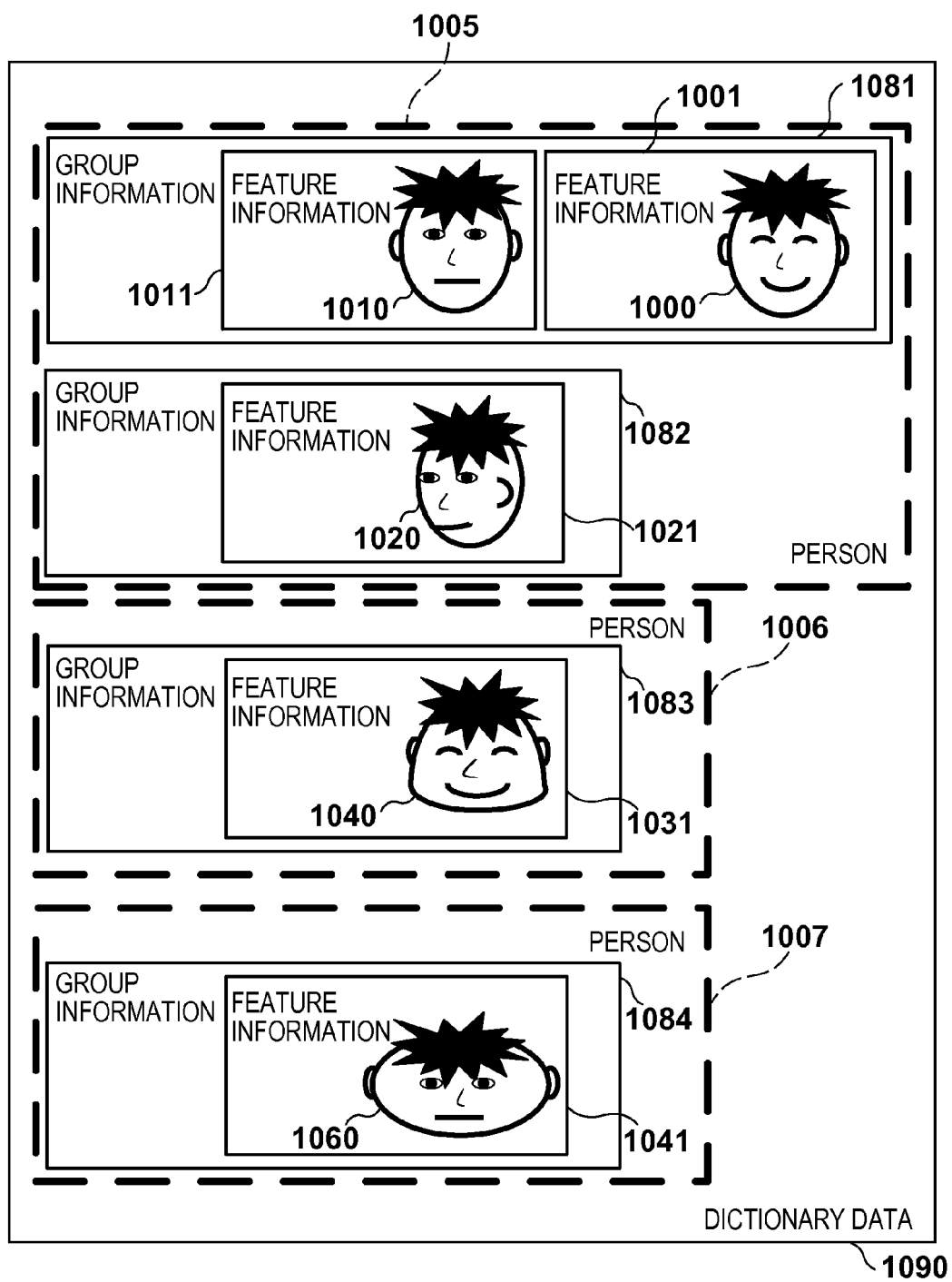
Figure 12D:
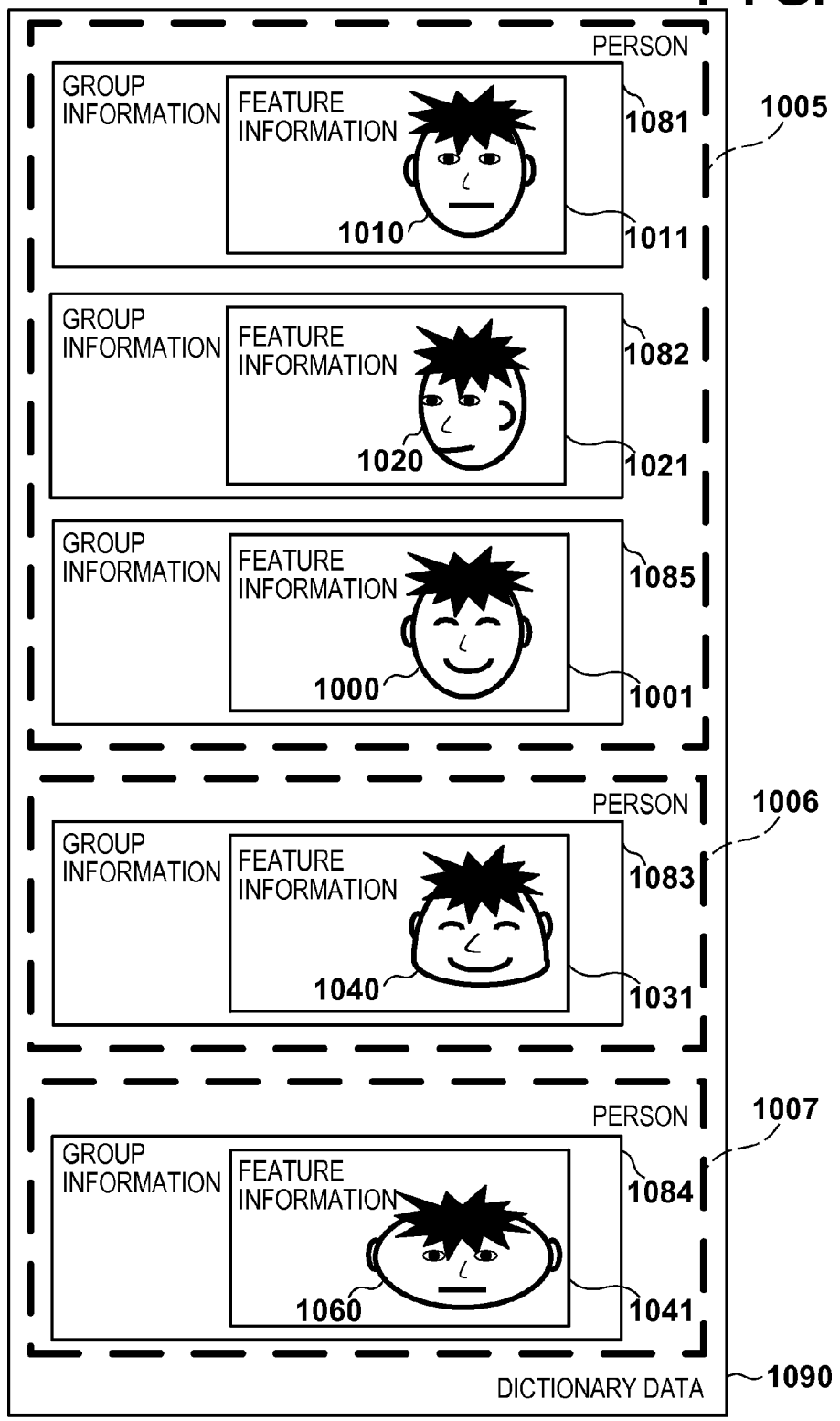
Figure 13:
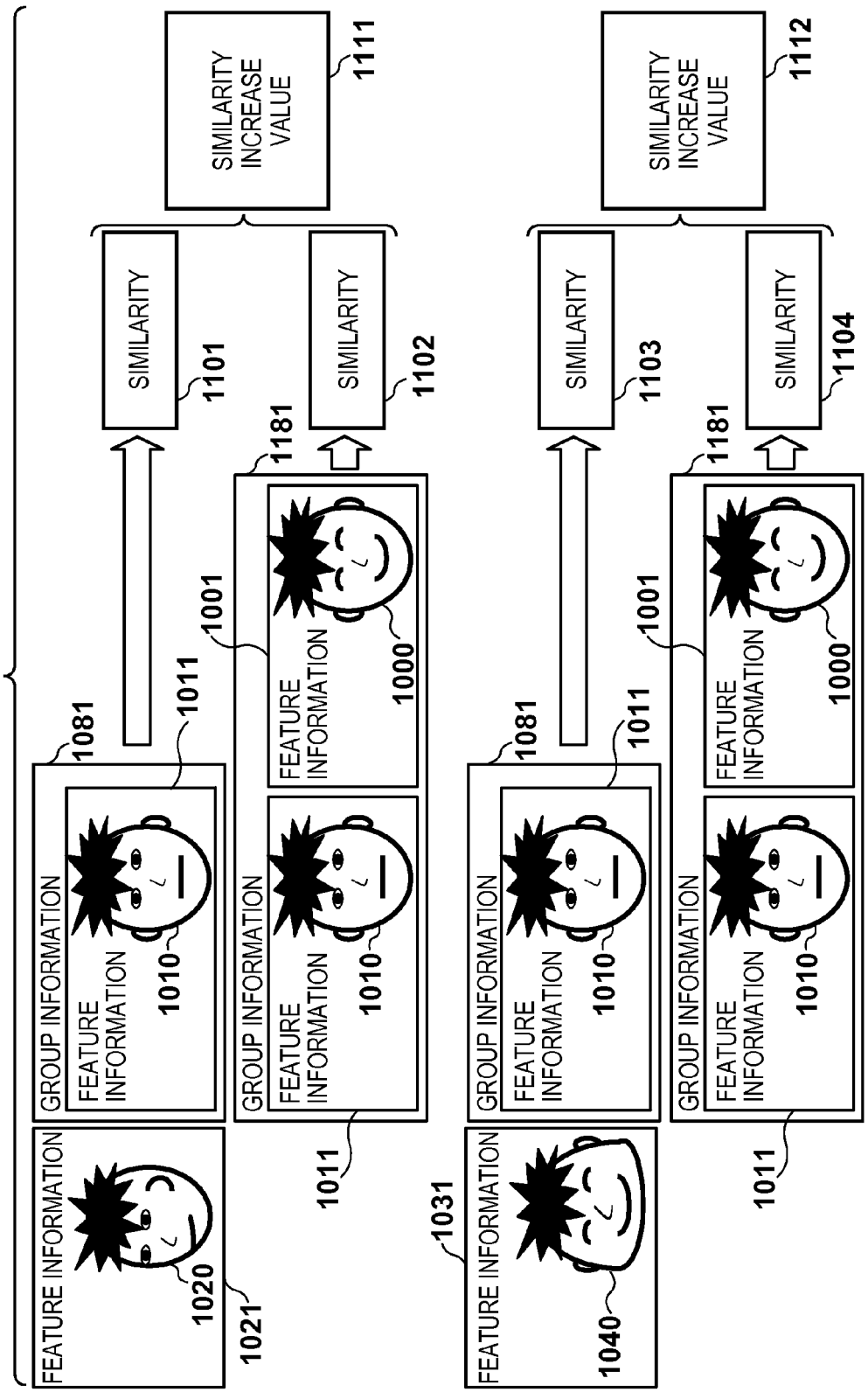
FIG. 13 is a view for explaining the dictionary data storage processing according to the third embodiment.

The third embodiment will be described next. The arrangement of an image capturing apparatus (digital camera 100) according to the third embodiment is the same as in the first embodiment (FIG. 1). Dictionary data registration processing by the image capturing apparatus according to the third embodiment will be described below in detail with reference to FIGS. 11, 12A to 12D, and 13. FIG. 11 is a flowchart for explaining dictionary data storage processing according to the third embodiment. FIGS. 12A to 12D are views for explaining dictionary data storage processing according to the third embodiment. FIG. 13 is a view for explaining a similarity increase value calculation method according to the third embodiment. Note that FIG. 11 shows processing from the NO branch of step S207 in FIG. 2. The processes in steps S201 to S208 are the same as those described in the first embodiment.

If a user operation accepted by a system control unit 150 in step S207 indicates additional registration, the process advances to step S1109. Note that in the third embodiment, assume that a face 1000 shown in FIG. 12A is detected in step S205, and feature information 1001 is extracted in step S206. Also assume that dictionary data 1090 shown in FIG. 12A is stored in a dictionary data storage unit 192.

If the user operation indicates new registration in step S207, information to specify the person and new group information to group the face of the person are associated with the feature information 1001 in step S208. The feature information 1001 and the new group information associated with the feature information are stored in the dictionary data storage unit 192, and the processing ends. FIG. 12B shows the dictionary data after the end of the processing when the new group information is associated. In FIG. 12B, since the new group information is associated, group information 1085 is newly added and stored as a person 1008.

If feature information of the same person as that of the face 1000 is stored in step S207 (additional registration), the user selects the same person as that of the face 1000 in step S1109.

In FIG. 12A, assume that a person 1005 is selected from persons 1005, 1006, and 1007 stored in the dictionary data 1090.

The process advances to step S1110, and a similarity calculation unit 193 selects one piece of feature information extracted from the face of the selected person 1005. In FIG. 12A, assume that feature information 1011 is selected from pieces of feature information 1011 and 1021 of the person 1005 stored in the dictionary data 1090.

The process then advances to step S1111, and the similarity calculation unit 193 calculates a similarity using the feature information selected in step S1110 and the feature information 1001 of the face 1000 extracted by a feature amount extraction unit 191. In FIG. 12A, a similarity 1091 is calculated from the pieces of feature information 1011 and 1001.

The process advances to step S1112, and the similarity calculation unit 193 determines whether the similarity to the feature information 1001 of the face 1000 has been calculated for all pieces of feature information stored in the dictionary data storage unit 192 concerning the selected person 1005. If unprocessed feature information remains, the process returns to step S1110 to repeat steps S1110 and S1111. In the above-described example, steps S1110 to S1112 are repeated until the similarities between the feature information 1001 of the face 1000 and the pieces of feature information 1011 and 1021 of the person 1005 are calculated.

The process advances to step S1113, and a group information setting unit 195 selects the highest one of the similarities calculated in step S1111 and the feature information used to calculate the highest similarity. Assume here that the feature information 1011 is selected from the pieces of feature information 1011 and 1021 of the person 1005 shown in FIG. 12A.

The process advances to step S1114, and the group information setting unit 195 compares the similarity selected in step S1113 with a grouping threshold value. If the similarity is equal to or lower than the grouping threshold value in step S1114, the process advances to step S1121 to associate the new group information of the selected person 1005 with the feature information 1001. FIG. 12D shows the dictionary data after the end of the processing when the similarity 1091 is selected as a highest similarity, and the similarity does not exceed the grouping threshold value. Since the similarity 1091 that is a highest similarity does not exceed the grouping threshold value, an unselected similarity 1092 is also lower than the grouping threshold value. For this reason, the group information 1085 is associated with the feature information 1001 and stored as the new group information of the person 1005 that is the same selected person.

In step S1114, if the similarity is higher than the grouping threshold value in step S1114, the process advances to step S1115, and the similarity calculation unit 193 selects group information associated with the feature information selected in step S1113. In the example shown in FIG. 12A, group information 1081 associated with the feature information 1011 is selected. The process advances to step S1116, and the similarity calculation unit 193 selects, from the selected person 1005, at least one of the pieces of feature information associated with group information different from the group information selected in step S1115. In FIG. 12A, assume that the feature information 1021 is selected. The process then advances to step S1117, and the similarity calculation unit 193 selects the feature information of a person whose similarity to the person 1005 is the highest from persons different from the person 1005 using the similarities stored in the dictionary data storage unit 192. In the example shown in FIG. 12A, assume that feature information 1031 of the person 1006 is selected.

Note that assume that the dictionary data storage unit 192 is assumed to store the similarities between the persons registered in the dictionary data. Assume that the calculation of the similarities between the registered persons is executed every time the dictionary data is updated. Alternatively, each registered person may be made to correspond to a person having a highest similarity out of the remaining registered persons.

The process advances to step S1118, and the similarity calculation unit 193 calculates, for two cases, the increase values of the similarity when the group information selected in step S1115 is associated with the feature information extracted in step S206. One is the increase value of the similarity between feature information belonging to a group of interest and feature information belonging to another group concerning the same person. The other is the increase value of the similarity between feature information belonging to a group of interest and feature information of another person.

First, concerning the same person, the similarity between feature information associated with the group information selected in step S1115 (a state before the group information is associated with the feature information extracted in step S206) and the feature information selected in step S1116 is calculated. The similarity calculation unit 193 also calculates a similarity using the feature information selected in step S1116 and feature information associated with the group information after the group information selected in step S1115 has been associated with the feature information extracted in step S206. The similarity calculation unit 193 calculates the similarity increase value of the same person from the two similarities calculated in the above-described way.

Next, the similarity calculation unit 193 calculates the similarity between feature information associated with the group information selected in step S1115 (a state before the group information is associated with the feature information extracted in step S206) and the feature information of another person selected in step S1117. The similarity calculation unit 193 also calculates a similarity using the feature information of the other person and feature information associated with the group information after the group information selected in step S1115 has been associated with the feature information extracted in step S206. The similarity calculation unit 193 calculates the similarity increase value of the other person from the two similarities calculated in the above-described way.

Calculation of the similarity increase value will be described in more detail with reference to FIG. 13. Referring to FIG. 13, group information 1181 represents a state in which the group information 1081 is associated with the feature information 1001. Hence, the group information 1081 and the group information 1181 are substantially identical. The similarity calculation unit 193 calculates a similarity 1101 using the group information 1081 and the feature information 1021 selected in step S1116. The similarity calculation unit 193 also calculates a similarity 1102 using the group information 1181 and the feature information 1021 selected in step S1116. In addition, the similarity calculation unit 193 calculates a similarity increase value 1111 of the same person using the similarities 1101 and 1102. Similarly, the similarity calculation unit 193 calculates a similarity 1103 using the group information 1081 and the feature information 1031 selected in step S1117. The similarity calculation unit 193 also calculates a similarity 1104 using the group information 1181 and the feature information 1031 selected in step S1117. The similarity calculation unit 193 calculates a similarity increase value 1112 of another person using the similarities 1103 and 1104.

The process advances to step S1119, and the group information setting unit 195 compares the similarity increase value 1111 of the same person with the similarity increase value 1112 of the other person obtained in step S1118. If the similarity increase value 1111 of the same person is higher than the similarity increase value 1112 of the other person, the process advances to step S1120. In step S1120, the group information setting unit 195 associates the group information 1081 selected in step S1115 with the feature information 1001 and stores it in the dictionary data storage unit 192. The processing thus ends. On the other hand, if the similarity increase value 1111 of the same person is equal to or lower than the similarity increase value 1112 of the other person, the process advances to step S1121. In step S1121, the group information setting unit 195 associates new group information of the selected person 1005 with the feature information 1001. FIG. 12C shows the dictionary data when the similarity increase value 1111 is higher than the similarity increase value 1112. In FIG. 12C, the group information 1081 is associated with the pieces of feature information 1011 and 1001.

As described above, according to the third embodiment, group information associated with feature information for which the maximum similarity is obtained is selected as a group candidate (step S1115). A change (increase value) in the similarity between, out of the pieces of feature information of the object, feature information obtained from a group other than the group candidate and feature information belonging to the group candidate before and after addition to the extracted feature information to the group candidate is calculated as the similarity increase value of the same person. In addition, a change (increase value) in the similarity between feature information of another object different from a specific object and feature information belonging to the group candidate before and after addition to the extracted feature information to the group candidate is calculated as the similarity increase value of the other person. When the similarity increase value of the same person is higher than the similarity increase value of the other person, the group information of the group candidate is associated with the feature information extracted in step S206.

Note that if no feature information can be selected in step S1116, step S1120 is directly executed. If one or more pieces of feature information are selected in step S1116, feature information having a largest increase value is employed. Personal recognition processing using the dictionary data generated by the above-described dictionary data storage processing according to the third embodiment is the same as in the first embodiment.

As described above, according to each of the above-described embodiments, the similarity calculated for another person can be lowered while suppressing the similarity calculated for the person of interest from lowering. It is therefore possible to provide a personal recognition apparatus and a personal recognition method, which can improve the recognition accuracy, and a dictionary storage method.

According to the present invention, it is possible to prevent a decrease in the authentication accuracy even when the number of feature information concerning the same object increases in dictionary data.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-286624, filed Dec. 27, 2011, which is hereby incorporated by reference herein in its entirety.

What is claimed is:

1. An object recognition apparatus comprising:
a processor; and
a memory including instructions which, when executed by the processor, cause the object recognition apparatus to:
store dictionary data in which a plurality of pieces of feature information obtained from a plurality of images of one object are put into groups based on similarities thereof and registered in association with the object;
detect an object from an image and, from an image of the object, extract feature information to be newly registered;
when the detected object is registered in the dictionary data, select a group corresponding to the detected object based on a similarity between the extracted feature information and feature information belonging to each group of the detected object;
when the detected object is not registered in the dictionary data, add a new dictionary data and register the extracted feature information;
when the detected object is registered in the dictionary data and the corresponding group has been selected, register the extracted feature information in the corresponding group of the dictionary data; and
when the detected object is registered in the dictionary data and the corresponding group has not been selected, add a new group to the detected object in the dictionary data and register the extracted feature information.

2. The apparatus according to claim 1, wherein the instructions further cause the object recognition apparatus to, when a maximum similarity out of the similarities between the extracted feature information and the respective pieces of feature information registered in the dictionary data for the detected object is higher than a predetermined threshold value, select, as the corresponding group, a group to which the feature information for which the maximum similarity is obtained belongs.

3. The apparatus according to claim 1, wherein the instructions further cause the object recognition apparatus to select, as the corresponding group, all groups to which each feature information whose similarity between the extracted feature information and the respective pieces of feature information registered in the dictionary data for the detected object is higher than a predetermined threshold value belongs.

4. The apparatus according to claim 1, wherein the instructions further cause the object recognition apparatus to select, as the corresponding group, a predetermined number of groups out of groups to which each feature information whose similarity between the extracted feature information and the respective pieces of feature information registered in the dictionary data for the detected object is higher than a predetermined threshold value belongs.

5. An object recognition apparatus comprising:
a processor; and
a memory storing instructions which, when executed by the processor, cause the object recognition apparatus to:
store dictionary data in which a plurality of pieces of feature information obtained from a plurality of images of one object are put into groups based on similarities thereof and registered in association with the object;
detect an object from an image and, from an image of the object, extract feature information to be newly registered;
when the detected object is registered in the dictionary data, select a group corresponding to the detected object based on a similarity between the extracted feature information and feature information belonging to each group of the detected object; and
when the corresponding group has been selected, register the extracted feature information in the corresponding group of the dictionary data; and
when the corresponding group has not been selected, add a new group to the detected object in the dictionary data and register the extracted feature information,
wherein a group candidate corresponding to the detected object is selected based on the similarity between the extracted feature information and the feature information belonging to each group of the detected object, and
wherein the group candidate is selected as the corresponding group when an increase value of a similarity obtained from feature information of the detected object, which is obtained from a group other than the group candidate, and feature information belonging to the group candidate when the extracted feature information is added to the group candidate is larger than an increase value of a similarity obtained from feature information of another object other than the detected object, which is selected from the dictionary data, and the feature information belonging to the group candidate when the extracted feature information is added to the group candidate.

6. The apparatus according to claim 5, wherein the instructions further cause the object recognition apparatus to select, as the feature information of the another object, feature information having a maximum similarity to the detected object out of all pieces of feature information of objects other than the detected object, which are registered in the dictionary data.

7. The apparatus according to claim 1, wherein the instructions further cause the object recognition apparatus to cause a user to select an object corresponding to the detected object from the objects registered in the dictionary data.

8. The apparatus according to claim 1, wherein the instructions further cause the object recognition apparatus to:
obtain feature information from an input image;
calculate, for each group, a similarity between the obtained feature information and the feature information registered in the dictionary data; and
when a maximum similarity out of the calculated similarities is higher than a recognition threshold value, determine an object corresponding to a group having the maximum similarity as a recognition result.

9. A dictionary data registration method performed by an object recognition apparatus including a storage unit configured to store dictionary data in which a plurality of pieces of feature information obtained from a plurality of images of one object are associated with the object, and put into groups based on similarities, and registered, the dictionary data registration method comprising:
detecting an object from an image and extracting, from an image of the object, feature information to be newly registered;
when the detected object is registered in the dictionary data, selecting a group corresponding to the detected object based on a similarity between the extracted feature information and feature information belonging to each group of the detected object;
when the detected object is not registered in the dictionary data, adding a new dictionary data and registering the extracted feature information;
when the detected object is registered in the dictionary data and the corresponding group is selected, registering the extracted feature information in the corresponding group of the dictionary data; and
when the detected object is registered in the dictionary data and the corresponding group is not selected, adding a new group to the detected object in the dictionary data and registering the extracted feature information.

10. A non-transitory computer readable storage medium storing a program that causes a computer to execute a dictionary data registration method of claim 9.

11. A dictionary data registration method performed by an object recognition apparatus including a storage unit configured to store dictionary data in which a plurality of pieces of feature information obtained from a plurality of images of one object are associated with the object, and put into groups based on similarities, and registered, the dictionary data registration method comprising:
detecting an object from an image and extracting, from an image of the object, feature information to be newly registered;
when the detected object is registered in the dictionary data, selecting a group corresponding to the detected object based on a similarity between the extracted feature information and feature information belonging to each group of the detected object; and
when the corresponding group is selected, registering the extracted feature information in the corresponding group of the dictionary data, and when the corresponding group is not selected, adding a new group to the detected object in the dictionary data and registering the extracted feature information,
wherein the step of selecting comprises:
selecting a group candidate corresponding to the detected object based on the similarity between the extracted feature information and the feature information belonging to each group of the detected object, and
selecting the group candidate as the corresponding group when an increase value of a similarity obtained from feature information of the detected object, which is obtained from a group other than the group candidate, and feature information belonging to the group candidate when the extracted feature information is added to the group candidate is larger than an increase value of a similarity obtained from feature information of another object other than the detected object, which is selected from the dictionary data, and the feature information belonging to the group candidate when the extracted feature information is added to the group candidate.

12. A non-transitory computer readable storage medium storing a program that causes a computer to execute a dictionary data registration method of claim 11.

* * * * *